United States Patent
Yamazaki et al.

(10) Patent No.: US 9,786,312 B2
(45) Date of Patent: Oct. 10, 2017

(54) HOLOGRAM REPRODUCING APPARATUS AND HOLOGRAM REPRODUCING METHOD

(71) Applicant: HITACHI CONSUMER ELECTRONICS CO., LTD., Kanagawa (JP)

(72) Inventors: Kazuyoshi Yamazaki, Tokyo (JP); Tatsuro Ide, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 15/022,935

(22) PCT Filed: Sep. 18, 2013

(86) PCT No.: PCT/JP2013/075063
§ 371 (c)(1),
(2) Date: Mar. 18, 2016

(87) PCT Pub. No.: WO2015/040681
PCT Pub. Date: Mar. 26, 2015

(65) Prior Publication Data
US 2016/0232933 A1    Aug. 11, 2016

(51) Int. Cl.
*G11B 7/0065* (2006.01)
*G11B 7/005* (2006.01)
(Continued)

(52) U.S. Cl.
CPC ............ *G11B 7/0065* (2013.01); *G11B 7/005* (2013.01); *G11B 7/00772* (2013.01);
(Continued)

(58) Field of Classification Search
None
See application file for complete search history.

(56) References Cited

U.S. PATENT DOCUMENTS

2010/0265808 A1* 10/2010 Yamakawa .......... G11B 7/0956
369/103

FOREIGN PATENT DOCUMENTS

JP     2004-281026 A    10/2004
JP     2006-171593 A     6/2006
(Continued)

OTHER PUBLICATIONS

International Search Report of PCT/JP2013/075063.

*Primary Examiner* — Brian Butcher
(74) *Attorney, Agent, or Firm* — Mattingly & Malur, PC

(57) ABSTRACT

The purpose of the present invention is to provide a hologram reproducing apparatus and a hologram reproducing method, which are suitable for reproducing hologram. The purpose can be achieved by means of a hologram reproducing apparatus, which reproduces information signals by irradiating an optical information recording medium with reference light, and a hologram reproducing method for the hologram reproducing apparatus. The hologram reproducing apparatus is characterized in being provided with: a polarization conversion section, which converts polarization of diffracted light that is generated when the optical information recording medium is irradiated with the reference light; a light receiving section, which receives the diffracted light having the polarization thereof converted by means of the polarization conversion section; and a servo signal generating circuit section, which generates signals for moving the optical information recording medium or the polarization conversion section using the diffracted light received by means of the light receiving section.

7 Claims, 21 Drawing Sheets

(51) Int. Cl.
| | |
|---|---|
| *G11B 7/08* | (2006.01) |
| *G11B 7/1381* | (2012.01) |
| *G11B 7/007* | (2006.01) |
| *G11B 7/24* | (2013.01) |
| *G11B 7/24044* | (2013.01) |
| G11B 7/09 | (2006.01) |
| G11B 7/0037 | (2006.01) |
| G11B 7/00 | (2006.01) |
| G11B 7/085 | (2006.01) |
| G11B 7/1365 | (2012.01) |

(52) U.S. Cl.
CPC ............ *G11B 7/083* (2013.01); *G11B 7/1381* (2013.01); *G11B 7/24* (2013.01); *G11B 7/24044* (2013.01); *G03H 2222/31* (2013.01); *G11B 7/0037* (2013.01); *G11B 7/08564* (2013.01); *G11B 7/094* (2013.01); *G11B 7/1365* (2013.01); *G11B 2007/0009* (2013.01); *G11B 2007/240025* (2013.01)

(56) References Cited

FOREIGN PATENT DOCUMENTS

| | | |
|---|---|---|
| JP | 2006-323926 A | 11/2006 |
| JP | 2007-304263 A | 11/2007 |
| JP | 2008-197575 A | 8/2008 |

* cited by examiner

HOLOGRAM REPRODUCING APPARATUS AND HOLOGRAM REPRODUCING METHOD

TECHNICAL FIELD

The present invention relates to a hologram reproducing apparatus performing reproduction using holography and a hologram reproducing method.

BACKGROUND ART

As a background art of the present technical field, disclosed is JP-A-2007-304263 (Patent Literature 1), for example. In this publication, "to provide a holographic memory device that can execute control such that reproduced light emitted from a reproduction target hologram passes through a polytopic filter appropriately" is described as a problem to be resolved and "a part of reproduced light emitted from a holographic memory 10 is split by a beam splitter. After astigmatism is introduced into the split reproduced light by a condensing lens 126 and a cylindrical lens 127, the reproduced light is received by a quadripartite PD 128. FE signals, RE signals, and TE signals are generated by an operation circuit, on the basis of signals from the quadripartite PD 128. In addition, the holographic memory 10 is driven in a focal direction, a radial direction, and a tangential direction, on the basis of the signals, and a position of the reproduction target hologram is corrected with an appropriate position" is described as a solution.

CITATION LIST

Patent Literature

Patent Literature 1: JP-A-2007-304263

SUMMARY OF INVENTION

Technical Problem

The holographic memory is a system for causing signal light and reference light to interfere with each other and recording interference fringes as a hologram on a medium. For example, in a two-beam angle multiplex system, a medium incidence angle of the reference light is changed and multiple recording of the hologram is performed at the same position on the medium. In addition, when reproduction is performed, the reference light is incident at the same medium incidence angle as a medium incidence angle when recording is performed, reproduced light diffracted by the hologram is detected by a camera, and information recorded on the medium is reproduced.

Generally, in the holographic memory, a recording density is improved by increasing a multiplex number and decreasing a size of the hologram on the medium. In addition, in the two-beam angle multiplex system, the recording density can be improved by decreasing an interval between holograms on the medium. However, high-precision medium position control is necessary for the reproduction.

For this problem, in Patent Literature 1, reproduced light diffracted by a disk is branched in front of the polytopic filter, a part of the reproduced light is detected, a position error signal showing a position deviation of the optical information recording medium is detected, and a position of the medium is controlled. However, a high-precision medium control method described in Patent Literature 1 is not suitable for high-speed reproduction.

Accordingly, an objective of the present invention is to provide a hologram reproducing apparatus and a hologram reproducing method suitable for reproducing a hologram.

Solution to Problem

The above objective can be achieved by the invention described in Claims. For example, the above objective can be achieved by using a hologram reproducing apparatus for reproducing an information signal by radiating reference light to an optical information recording medium, including: a polarization converting unit that converts polarization of diffracted light generated when the reference light is radiated to the optical information recording medium; a light receiving unit that receives the diffracted light of which the polarization has been converted by the polarization converting unit; and a servo signal generating circuit unit that generates a signal to move the optical information recording medium or the polarization converting unit, using the diffracted light received by the light receiving unit.

Advantageous Effects of Invention

According to the present invention, a hologram reproducing apparatus and a hologram reproducing method suitable for reproducing a hologram can be provided.

DESCRIPTION OF EMBODIMENTS

First Embodiment

Figure 1:
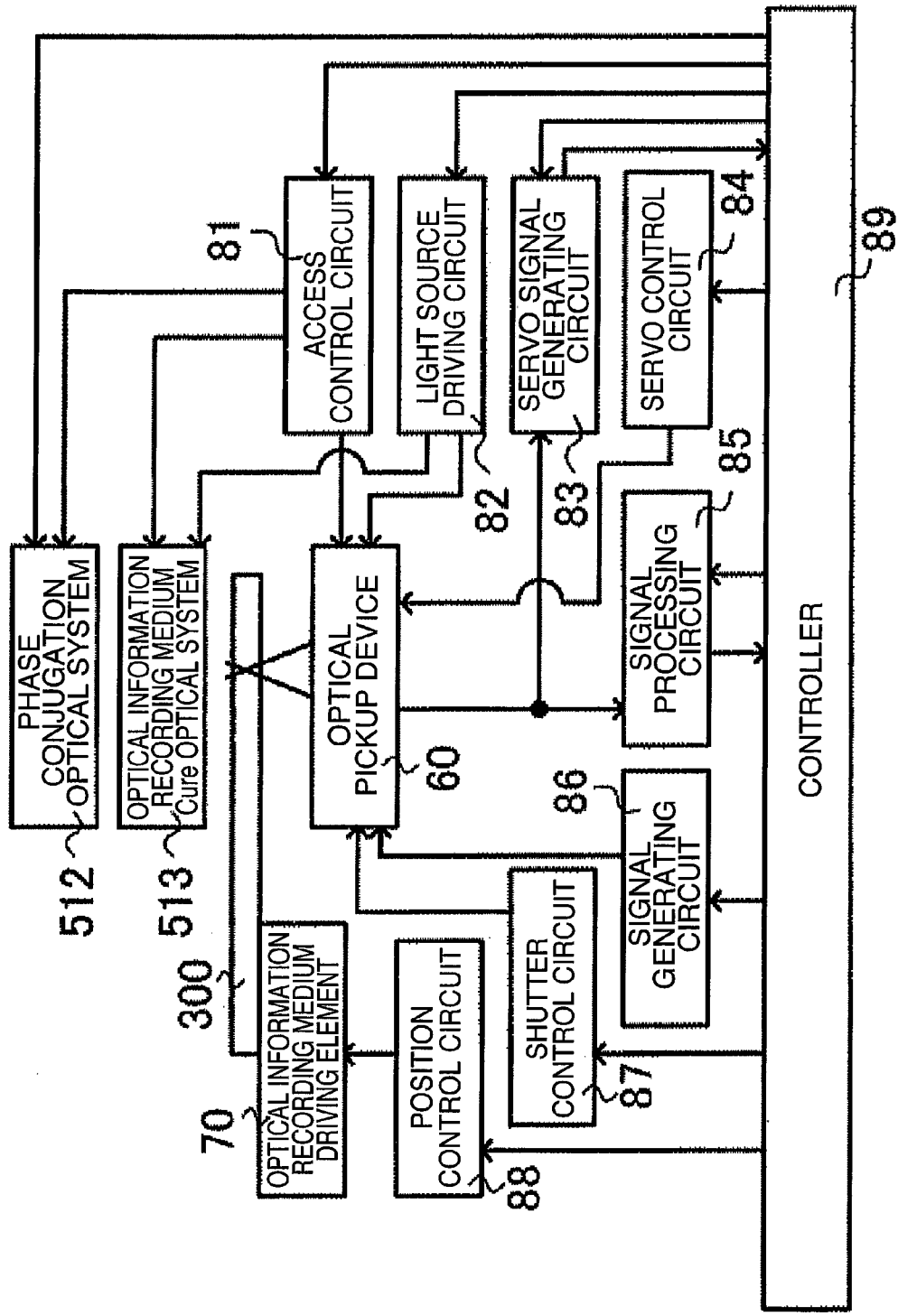
FIG. 1 is a diagram illustrating a hologram reproducing apparatus in a first embodiment.

FIG. 1 illustrates an entire configuration of a hologram reproducing apparatus according to a first embodiment of the present invention. The hologram reproducing apparatus according to this embodiment also includes a function of recording information on an optical information recording medium. For example, the hologram reproducing apparatus includes an optical pickup device 60, a phase conjugation optical system 512, an optical information recording medium Cure optical system 513, and an optical information recording medium driving element 70 of a configuration illustrated in FIG. 2, for example.

The optical pickup device 60 executes a function of emitting reference light and signal light to an optical information recording medium 300 and recording digital information using a hologram. At this time, a recorded information signal is transmitted to a spatial light modulator in the optical pickup device 60 via a signal generating circuit 86 by a controller 89 and the signal light is modulated by the spatial light modulator. When information recorded on the optical information recording medium 300 is reproduced, phase conjugation light of the reference light emitted from the optical pickup device 60 is generated by the phase conjugation optical system 512. Here, the phase conjugation optical system 512 indicates a galvano mirror 50 in the case of FIG. 2, for example. In addition, the phase conjugation light is a light wave propagating in a reverse direction while maintaining the same wave front as a wave front of input light.

Reproduced light reproduced by the phase conjugation light is detected by an imaging element 53 in the optical pickup device 60 and a signal is reproduced by a signal processing circuit 85. Radiation times of the reference light and the signal light radiated to the optical information recording medium 300 can be adjusted by controlling an opening/closing time of a shutter 13 in the optical pickup device 60 via a shutter control circuit 87 by the controller 89. The optical information recording medium Cure optical system 513 executes a function of generating a light beam used for precuring and postcuring of the optical information recording medium 300.

Here, the precuring is a previous process for radiating a predetermined light beam in advance before the reference light and the signal light are radiated to a desired position in the optical information recording medium 300, when information is recorded at the desired position. In addition, the postcuring is a post-process for radiating a predetermined light beam to disable additional writing at the desired position in the optical information recording medium 300, after the information is recorded at the desired position.

A predetermined light source driving current is supplied from a light source driving circuit 82 to light sources in the optical pickup device 60 and the optical information recording medium Cure optical system 513 and a light beam having a predetermined light amount can be emitted from each light source.

Signals to generate position error signals of a division wavelength plate 200 and the optical information recording medium 300 are output from the optical pickup device 60. Using these signals, the position error signals are generated by a servo signal generating circuit 83 and a position of the optical information recording medium 300 can be roughly adjusted by a position control circuit 88. Likewise, the division wavelength plate 200 is finely adjusted by the servo control circuit 84. In addition, the servo control circuit executes control to switch an opening 100 and the division wavelength plate 200.

The optical pickup device 60, the phase conjugation optical system 512, and the optical information recording medium Cure optical system 513 may be simplified by collecting some optical system configurations or all optical system configurations as one optical system configuration.

Figure 2:
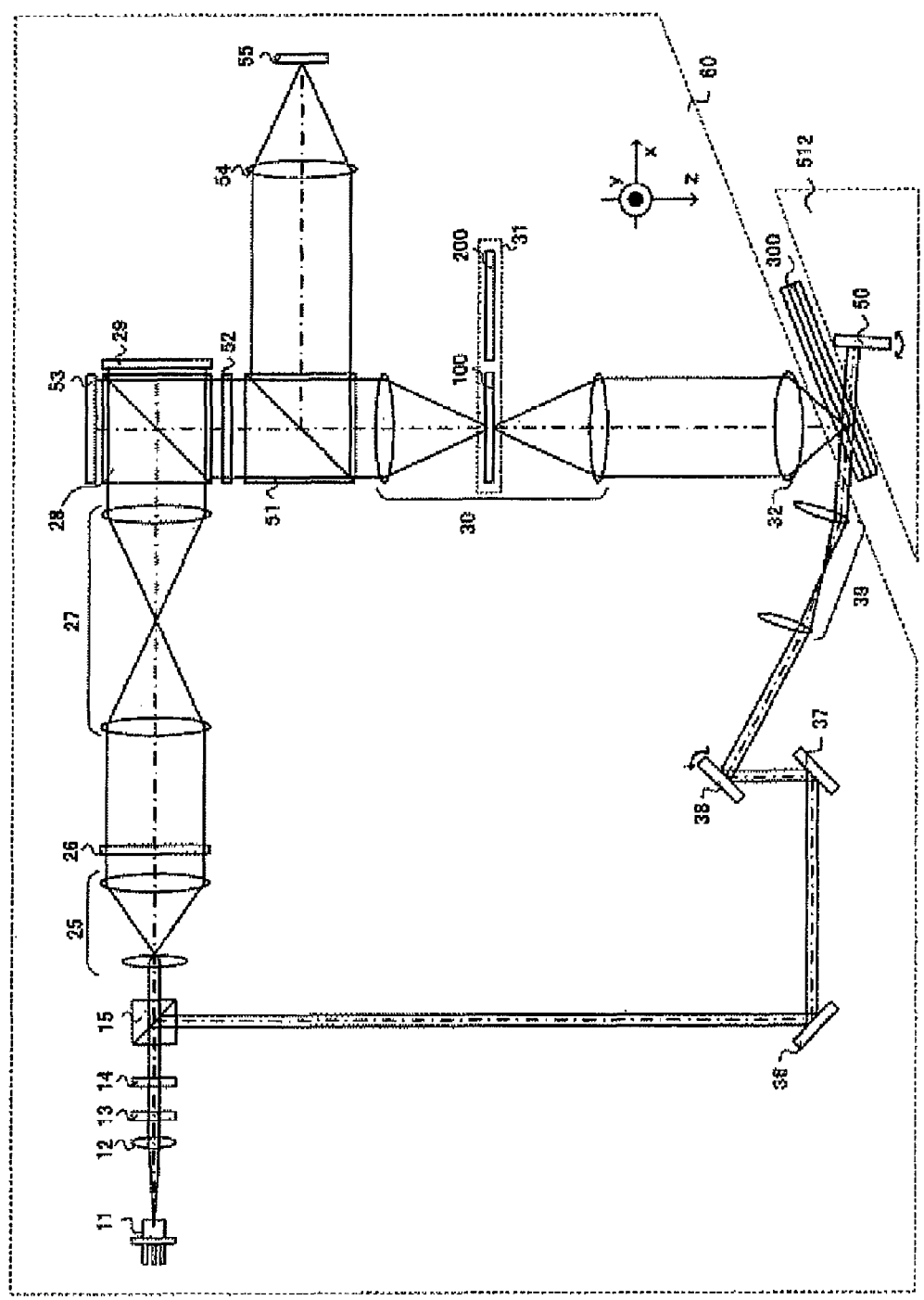
FIG. 2 is a diagram illustrating an optical system in the first embodiment.

FIG. 2 illustrates optical systems of the optical pickup device 60 and the phase conjugation optical system 512 in the hologram recording apparatus of the two-beam angle multiplex system according to this embodiment. A recording method and a reproducing method according to this embodiment will be described using FIG. 2. First, the recording method according to this embodiment will be described.

A light beam emitted from a semiconductor laser 11 passes through a collimation lens 12, is converted to have a desired beam diameter, passes through a shutter 13, and is incident on a polarization variable element 14. In addition, the light beam is converted into polarized light including a p-polarized light component and an S-polarized light component by the polarization variable element 14. The polarization variable element 14 is an element that converts the light beam into predetermined polarized light according to recording or reproduction. In this embodiment, the light beam is converted into the polarized light including the P-polarized light component and the S-polarized light component at the time of recording and is converted into S-polarized light at the time of reproduction.

The light beam emitted from the polarization variable element 14 is incident on a PBS prism 15 and the P-polarized light component passes through and the S-polarized light component is reflected by the PBS prism 15. Here, the light beam passing through the PBS prism 15 is called signal light and the light beam reflected on the PBS prism 15 is called reference light. The signal light passing through the PBS prism 15 is converted to have a desired beam diameter by a beam expander 25. The signal light passing through the beam expander 25 is incident on the spatial light modulator 29 via a phase mask 26, a relay lens 27, and a PBS prism 28. The spatial light modulator 29 is an optical element that converts polarization and adds two-dimensional data to the signal light.

In addition, the signal light to which information has been added by the spatial light modulator 29 is reflected on the PBS prism 28 and is incident on the opening 100 via a polarization variable element 52, a PBS prism 51, and a relay lens 30. Here, because the PBS prism 51, a detection lens 54, and a light detector 55 are disposed in a direction vertical to the drawing, the signal light reflected on the PBS prism 28 passes through the PBS prism 51.

Figure 3:
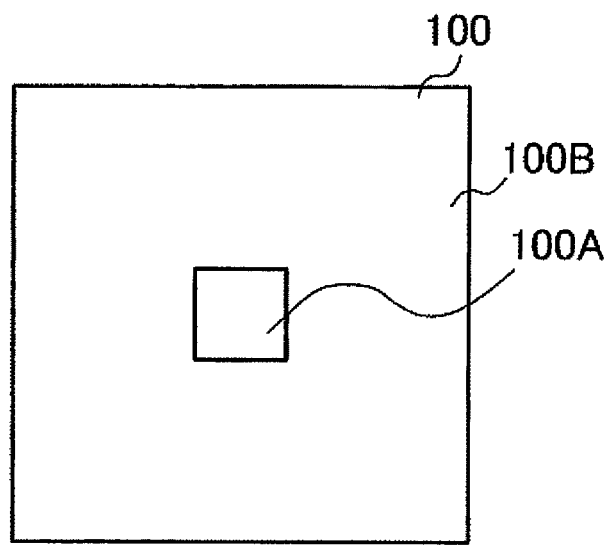
FIG. 3 is a diagram illustrating an opening in the first embodiment.

FIG. 3 illustrates the opening 100. The opening 100 is disposed to remove a high frequency component of the signal light added by the spatial light modulator 29 to increase a recording density of the optical recording medium. The opening 100 is provided with regions 100A and 100B and the regions 100A and 100B become a transmission region and a light shielding region, respectively. The signal light emitted from the opening 100 is condensed in the optical information recording medium 300 via an objective lens 32.

Meanwhile, the reference light reflected on the PBS prism 15 is incident on the optical information recording medium 300 via a mirror 36, a mirror 37, a galvano mirror 38, and a scanner lens 39.

The galvano mirror 38 can change an angle of a mirror and can change an incidence angle of the reference light on the optical information recording medium 300. In addition, the scanner lens 39 is a lens that can cause the reference light of a different angle reflected on the galvano mirror 38 to be incident on substantially the same position of the optical information recording medium 300, in a state in which the angle of the reference light is changed. For this reason, angle multiplexing can be realized at substantially the same position by using the galvano mirror 38 and the scanner lens 39.

Here, the signal light and the reference light are incident to superimpose each other in the optical information recording medium 300. As a result, interference fringes are formed in the optical information recording medium 300 and the interference fringes are recorded as a hologram on the optical information recording medium 300.

After the information is recorded on the optical information recording medium 300, the shutter 13 is closed and next recorded information is displayed by the spatial light modulator 29. At the same time, the galvano mirror 38 rotates by a minute amount and an incidence angle of the reference light on the optical information recording medium 300 changes. Then, if the shutter 13 is opened, the next information is recorded at the same position of the optical information recording medium 300 at an angle of the reference light different from the angle of the reference light recorded previously. By repeating this, angle multiplexing recording is performed. In addition, when predetermined multiplicity is realized, a position is moved and recording is performed. Here, information recorded at a predetermined angle is called a page and a region where recording is performed at multiplex angles is called a book.

Next, the reproducing method will be described. First, when the reproduction is performed, the controller 89 executes control to switch the opening 100 and the division wavelength plate 200 of the optical pickup device 60. As a specific switching method, switching may be executed by changing a position by a stepping motor and the switching may be executed by other method.

The light beam emitted from the semiconductor laser 11 passes through the collimation lens 12, is converted to have a desired beam diameter, passes through the shutter 13, and is incident on the polarization variable element 14. In addition, the light beam is converted into S-polarized light by the polarization variable element 14 and is reflected on the PBS prism 15. The reference light reflected on the PBS prism 15 is incident on the galvano mirror 50 via the mirror 36, the mirror 37, the galvano mirror 38, the scanner lens 39, and the optical information recording medium 300. The controller 89 controls the galvano mirror 50 such that incident light is substantially vertical to the galvano mirror 50 and the incident reference light is reflected in substantially an opposite direction and is incident on the optical information recording medium 300 again. In addition, the reference light is incident on the optical information recording medium 300, so that reproduced light is generated as diffracted light of a page included in a predetermined book.

In addition, the diffracted light is generated simultaneously from a page included in a book in the vicinity of a predetermined book to be reproduced, other than a page included in the predetermined book to be reproduced. Here, reproduced light other than the page included in the predetermined book to be reproduced is called other diffracted light.

The reproduced light and other diffracted light are incident on the division wavelength plate 200 in the relay lens 30 via the objective lens 32. The relay lens 30 is configured using at least two lenses and the reproduced light and other diffracted light are substantially converged at a position of the division wavelength plate 200 in the relay lens 30. The division wavelength plate 200 can be driven in an optical axis direction and a plane direction vertical to an optical axis. Here, the division wavelength plate 200 is disposed to separate the reproduced light and other diffracted light.

Figure 4:
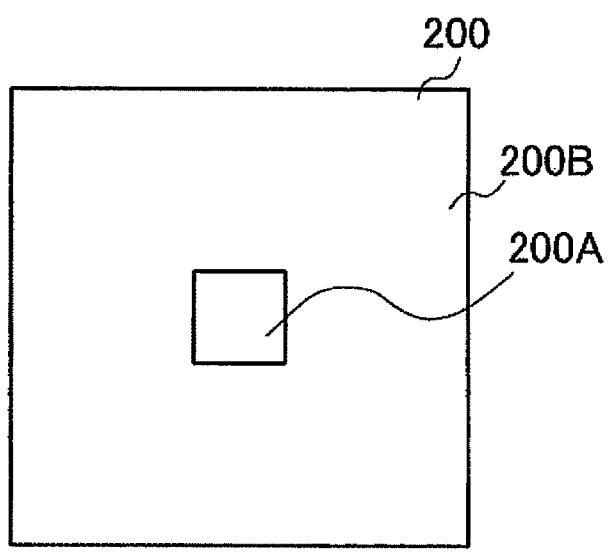
FIG. 4 is a diagram illustrating a division wavelength plate in the first embodiment.

FIG. 4 illustrates the division wavelength plate 200. The division wavelength plate 200 is provided with regions 200A and 200B and the regions 200A and 200B become a transmission region and a ½ wavelength plate region, respectively. Reproduced light emitted from the region 200A is emitted in the same state as incident polarized light and reproduced light emitted from the region 200B is emitted as polarized light different from the incident polarized light. When the reproduction is performed, the reproduced light is incident on the region 200A and is emitted as polarized light equal to the incident polarized light. Other diffracted light is incident on the region 200B and is emitted as polarized light orthogonal to the incident polarized light. The division wavelength plate 200 is a polarizing unit that polarizes predetermined light of the reproduced light and the diffracted light.

The reproduced light emitted from the division wavelength plate 200 is incident on the polarization variable element 52 via the relay lens 30 and the PBS prism 51. The polarization variable element 52 is an element that converts S-polarized light into P-polarized light at the time of the reproduction. For this reason, the reproduced light emitted from the polarization variable element 52 passes through the PBS prism 28 and is incident on the imaging element 53.

Reproduction image data is generated on the basis of the reproduced light incident on the imaging element 53. In addition, other diffracted light emitted from the division wavelength plate 200 is reflected on the PBS prism 51 and is incident on the light detector 55 via the detection lens 54. However, the reproduced light at that time is not incident on a light receiving unit on the light detector 55. As described above, in this embodiment, the reproduced light and other diffracted light are separated.

Next, the galvano mirror 38 rotates by a minute amount and an incidence angle of the reference light on the optical information recording medium 300 changes. As a result, image data of pages included in the same book and having different recording angles is reproduced. In addition, when reproduction of pages of the predetermined number ends, the optical information recording medium 300 and the division wavelength plate 200 are controlled on the basis of the position error signals and reproduction of a next book is performed.

Here, a position error signal detection method according to this embodiment will be described. If a position of a book including pages to be reproduced is deviated with respect to the objective lens 32, the reproduced light is incident on the region 200B of the division wavelength plate 200. For this reason, polarization of the reproduced light is converted. As a result, the reproduced light is reflected on the PBS prism 51 and is incident on the light detector 55 via the detection lens 54.

Figure 5:
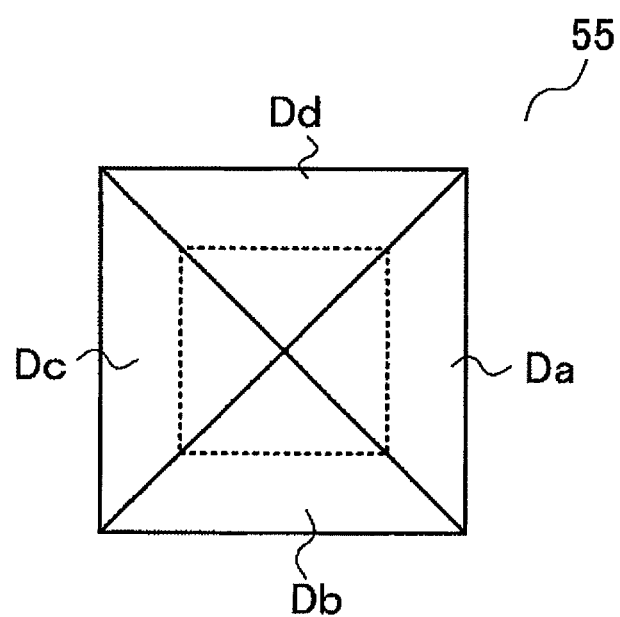
FIG. 5 is a diagram illustrating a light detector in the first embodiment.

FIG. 5 illustrates the light detector 55. The light detector 55 has four light receiving units Da, Db, Dc, and Dd. In this embodiment, the reproduced light is incident on the light receiving units Da, Db, Dc, and Dd according to incidence positions of the reproduced light on the region 200B of the division wavelength plate 200. When signals detected by the light receiving units Da, Db, Dc, and Dd are set as signals A, B, C, and D, position error signals XPES, YPES, and ZPES showing relative position deviations of the optical information recording medium 300 and the division wavelength plate 200 are represented as follows.

$$XPES = A - C$$

$$YPES = B - D$$

$$ZPES = A + B + C + D \quad \text{[MATH. 1]}$$

Figure 6:
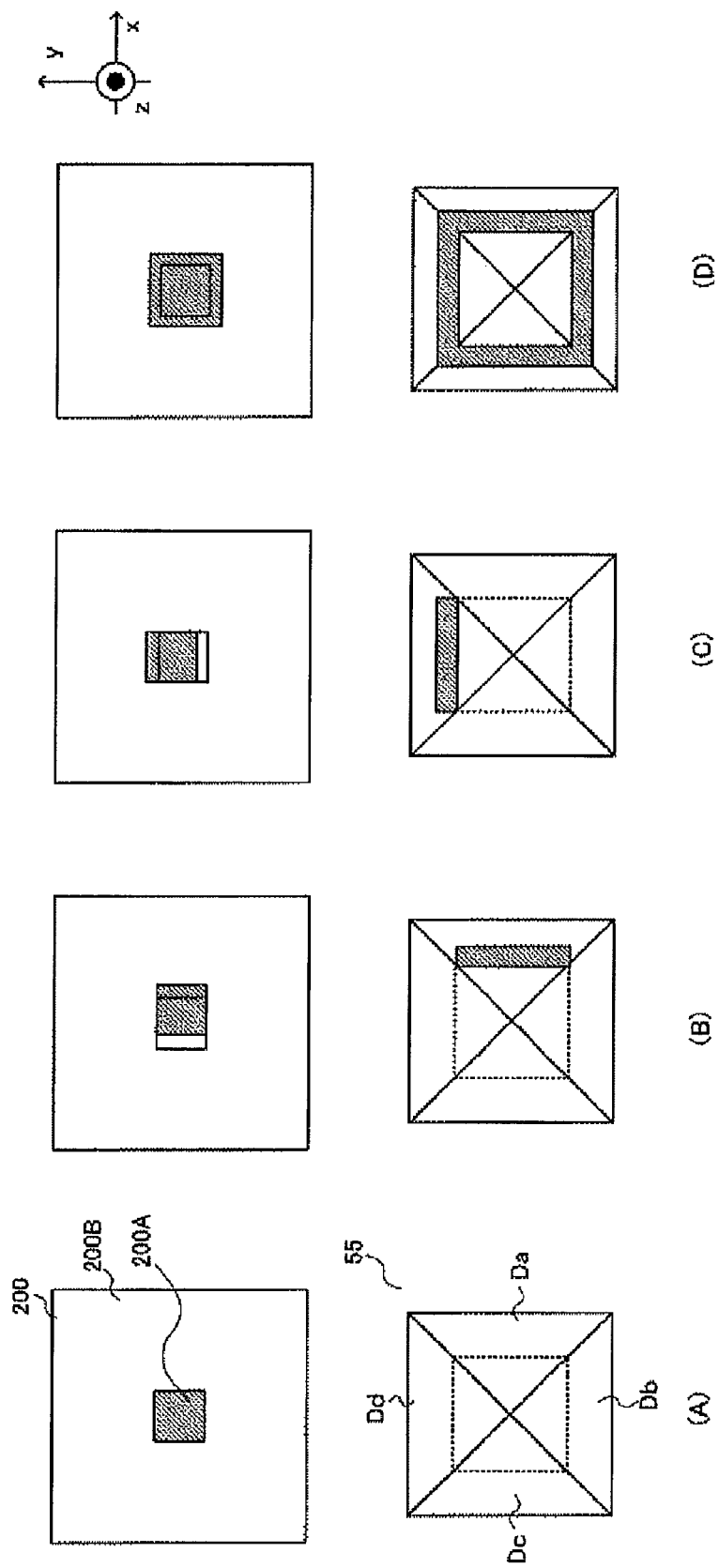
FIGS. 6(A) to 6(D) are diagrams illustrating a detection method of a position error signal in the first embodiment.

FIGS. 6(A) to 6(D) illustrate the division wavelength plate 200 and the light detector 55 in the case in which a position of a book to be reproduced is deviated with respect to the objective lens 32. FIGS. 6(A), (B), (C), and (D) illustrate the case in which the position of the book to be reproduced is optimal with respect to the objective lens, the case in which the position is deviated in an x direction, the case in which the position is deviated in a y direction, and the case in which the position is deviated in a z direction, respectively. In addition, regions shown by oblique lines in the drawings show the reproduced light.

For example, as illustrated in FIG. 6(B), when the reproduced light is deviated in a positive direction of the x direction with respect to the division wavelength plate 200, the reproduced light passing through the region 200B of the division wavelength plate 200 is incident on the light receiving unit Da of the light detector 55 and a voltage is generated in the signal A. For this reason, if an operation (A-C) of XPES is executed by an operation method described in MATH. 1, a positive voltage is obtained. Meanwhile, when the reproduced light is deviated in a negative direction of the x direction with respect to the division wavelength plate 200, the reproduced light passing through the region 200B of the division wavelength plate 200 is incident on the light receiving unit Dc of the light detector 55. For this reason, a voltage is generated in the signal C. If the operation of XPES is executed, a negative voltage is obtained. When the division wavelength plate 200 and the reproduced light are matched with each other in the x direction (FIG. 6(A)), there is no reproduced light passing through the region 200B. For this reason, if the operation of XPES is executed, a voltage becomes zero.

From the above, the division wavelength plate 200 may be driven in the x direction such that the voltage of XPES becomes zero. As a result, relative positions of the region 200A of the division wavelength plate 200 and the reproduced light can be matched with each other. This is the same in the y direction (FIG. 6(C)).

Next, when the position is deviated in a positive direction of the z direction, a shape of the reproduced light becomes larger than the region 200A on the division wavelength plate 200 and a part of the reproduced light is incident on the division wavelength plate 200. As a result, the reproduced light is incident on the four light receiving units Da, Db, Dc, and Dd of the light detector 55. If the operation of ZPES is executed by the operation method described in MATH. 1, a positive voltage is obtained. In addition, even when the position is deviated in a negative direction of the z direction, a positive voltage is obtained in ZPES. Meanwhile, when there is no deviation of the z direction (FIG. 6(A)), there is no reproduced light incident on the region 200B. For this reason, if the operation of ZPES is executed, the voltage becomes zero.

From the above, the division wavelength plate 200 may be driven in the z direction such that the voltage of ZPES becomes zero. As a result, the region 200A of the division wavelength plate 200 and the reproduced light can be matched with each other. Detection of the position error signal is performed by the servo signal generating circuit 83 and the detected position error signal is transmitted to the controller 89. The division wavelength plate 200 is driven by the servo control circuit 84 using the position error signal transmitted to the controller 89. For a specific driving method, for example, a stepping motor or a driving element of a magnetic circuit may be used.

Figure 7:
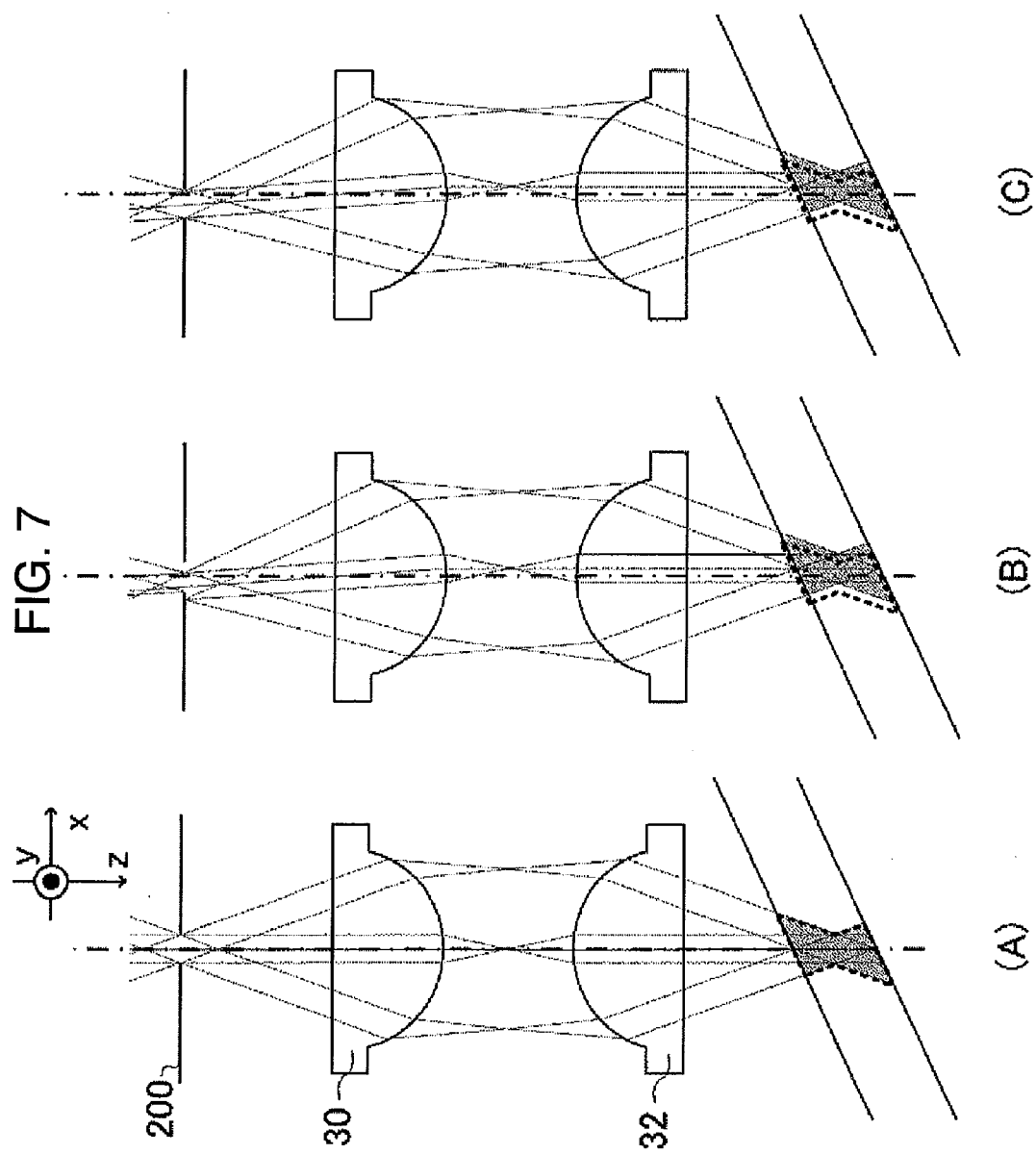
FIGS. 7(A) to 7(C) are diagrams illustrating a correction method of an optical information recording medium position deviation in the first embodiment.

Next, an effect when the position of the division wavelength plate 200 is controlled will be described. FIGS. 7(A) to 7(C) schematically illustrate a state of the reproduced light. To simplify the description, components other than components used for the reproduction are omitted. In addition, (A) shows the case in which a position of a book to be reproduced is not deviated with respect to the objective lens 32 and (B) and (C) illustrate the case in which the position is deviated. In addition, (C) illustrates the case in which the division wavelength plate 200 is controlled on the basis of the position error signal and (B) illustrates the case in which the division wavelength plate 200 is not controlled. Here, the division wavelength plate 200 does not have a light shielding function originally. However, to simplify the description, the light shielding function is described as the opening.

As illustrated in FIGS. 7(B) and (C), if the position of the book to be reproduced is deviated with respect to the objective lens 32, the reproduced light is incident on the region 200B of the division wavelength plate 200. For this reason, an amount of the reproduced light incident on the imaging element 53 decreases and stable reproduction is disabled. Meanwhile, as illustrated in FIG. 7(A), the position of the division wavelength plate 200 is controlled, so that the entire reproduced light is incident on the region 200A of the division wavelength plate 200. As a result, the sufficient reproduced light is incident on the imaging element 53 and the stable reproduction is enabled. In FIGS. 7(A) to 7(C), the case in which the position is deviated in the plane direction with respect to the division wavelength plate 200 has been described. However, the result is the same even in the case in which the position is deviated in the optical axis direction with respect to the division wavelength plate 200.

As such, in this embodiment, the control of the division wavelength plate 200 is executed using XPES, YPES, and ZPES. In Patent Literature 1, the optical information recording medium 300 is controlled. In the case of this embodiment, the position of the division wavelength plate 200 is mainly controlled. In the case of this embodiment, because the division wavelength plate 200 is lighter than the optical information recording medium 300, high-speed control can be executed even though the same driving element is used. In addition, high-precision control can be executed by using the position error signals. The division wavelength plate 200 according to this embodiment is preferably controlled in the following order.

(1) Control of a plane direction of the division wavelength plate 200 using XPES and YPES (2) Control of an optical axis direction of the division wavelength plate 200 using ZPES The control can be executed in reverse order. However, in this case, because a state in which a signal remains greatly in ZPES becomes an optimal position, there is a problem in that the control becomes unstable. The control is executed in the above order, so that more stable control is executed. However, the control may be executed at the same time.

Here, in the configuration of this embodiment, there is concern that diffracted light from an adjacent book is incident on the light detector 55 when a book interval is small. In this case, to correspond to the concern, recording of the adjacent book is performed such that the diffracted light from the adjacent book is not generated, at the incidence angle of the reference light performing reproduction of the predetermined book. At this time, because the diffracted light from a book separated by two books or more is not incident on the light receiving unit, a problem does not occur. In addition, because the position of the division wavelength plate 200 may be changed for each book, a page to control a position may be determined previously in the book. In this way, because a recording angle between the adjacent books can be deviated by predetermined pages, the diffracted light from the adjacent books can be avoided without reducing a capacity greatly, even though recoding is performed with a large angle deviation where other diffracted light is not generated.

In addition, recording may be performed such that the diffracted light from the adjacent books become the same. In this case, other diffracted light is incident on the light receiving unit. However, because a differential signal is operated, other diffracted light is cancelled.

Figure 8:
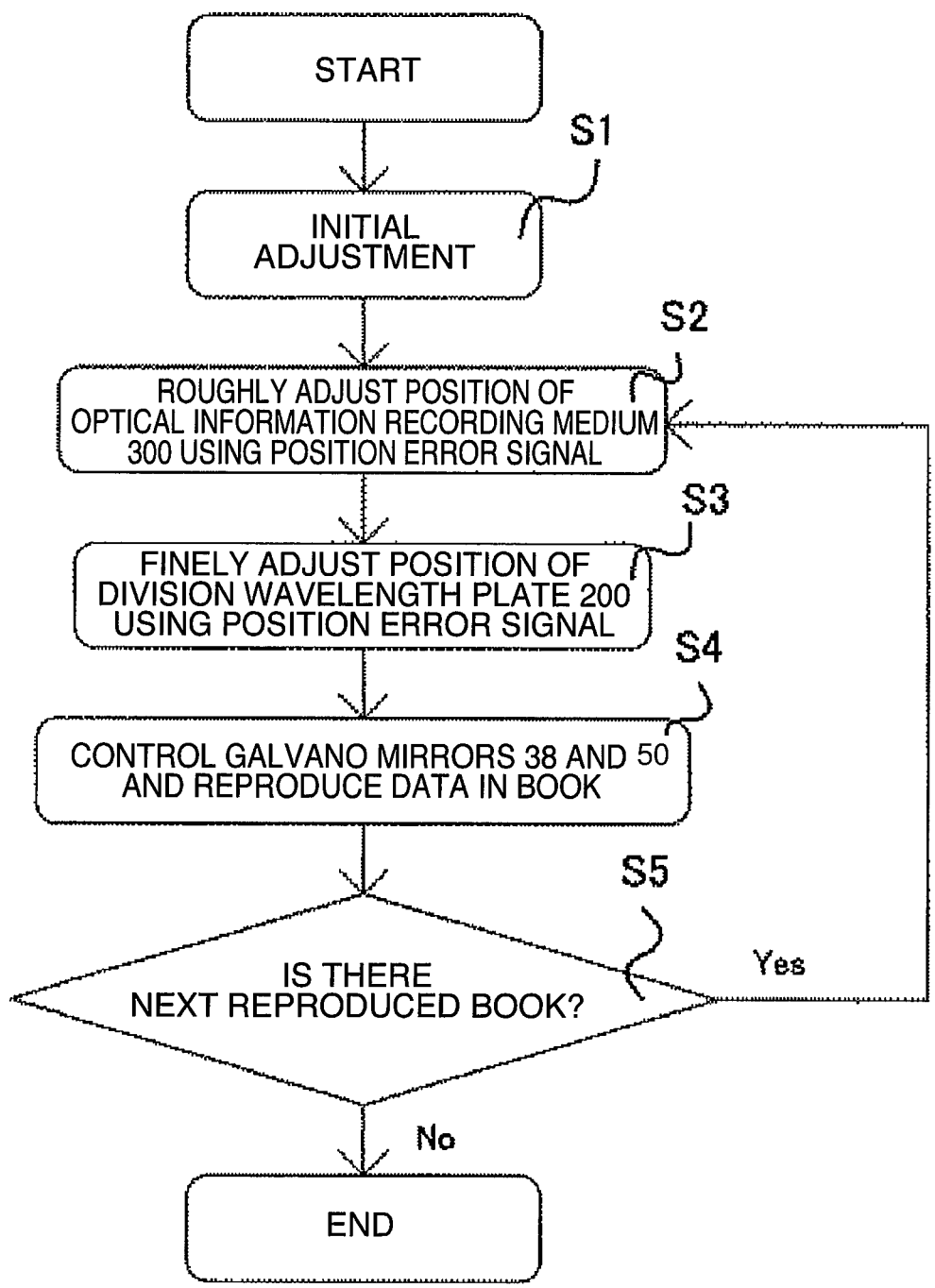
FIG. 8 is a diagram illustrating a flowchart when an optical information recording medium is moved in the first embodiment.

Next, a control flow at the time of the reproduction will be described. FIG. 8 illustrates the control flow at the time of the reproduction.

(S1) Initial adjustment: the controller 89 drives the galvano mirror 38 included in the optical pickup device 60 or the galvano mirror 50 included in the phase conjugation optical system 512 and executes the initial adjustment. In the initial adjustment, an incidence angle of the reference light on the optical information recording medium 300 is adjusted by driving the galvano mirrors 38 and 50, such that a light amount of the reproduction light is maximized in the imaging element 53. In addition, the position error signal is generated by the servo signal generating circuit 83, using reproduced light generated at that time.

(S2) Rough adjustment: the controller 89 transmits the position error signal generated at the time of the initial adjustment of S1 to the position control circuit 88 and the position control circuit 88 drives the optical information recording medium driving element 70 and adjusts (roughly adjusts) a position of the optical information recording medium 300.

(S3) Fine adjustment: the controller 89 transmits the position error signal generated at the time of the rough adjustment of S2 to the servo control circuit 84, drives a position of the division wavelength plate 200, and adjusts (finely adjusts) the position.

(S4) After the fine adjustment, the controller 89 drives the galvano mirror 38 included in the optical pickup device 60 or the galvano mirror 50 included in the phase conjugation optical system 512 and reproduces page data in a book.

(S5) The controller 89 confirms whether there is a next book, using information obtained from the reproduced page data, and executes adjustment of the optical information recording medium 300, when there is the next book.

In the control flow, because the position error signals are the error signals showing the relative positions of the optical information recording medium 300 and the division wavelength plate 200, the position is roughly adjusted in the optical information recording medium 300 and the position is finely adjusted in the division wavelength plate 200. However, the optical information recording medium 300 may be controlled with mechanical precision or precision of a sensor.

As described above, in this embodiment, the reproduced light and other diffracted light are separated by using the division wavelength plate 200 and the PBS prism 51. In addition, the reproduced light is separated by the division wavelength plate 200 and is detected, so that the division wavelength plate 200 as well as the optical information recording medium 300 can be controlled with high precision. For example, as described in Patent Literature 1, if the reproduced light is branched in front of the opening and the position error signal is generated, a signal does not change with respect to the position deviation of the opening (division wavelength plate) and as a result thereof, there is a problem in that an actual position is not recognized. For this reason, if disturbance such as a heat of the driving element occurs, there is a problem in that a part of the reproduction signal cannot be detected. Therefore, as in this embodiment, the position error signal is preferably detected at the back of the opening (division wavelength plate 200).

Figure 9:
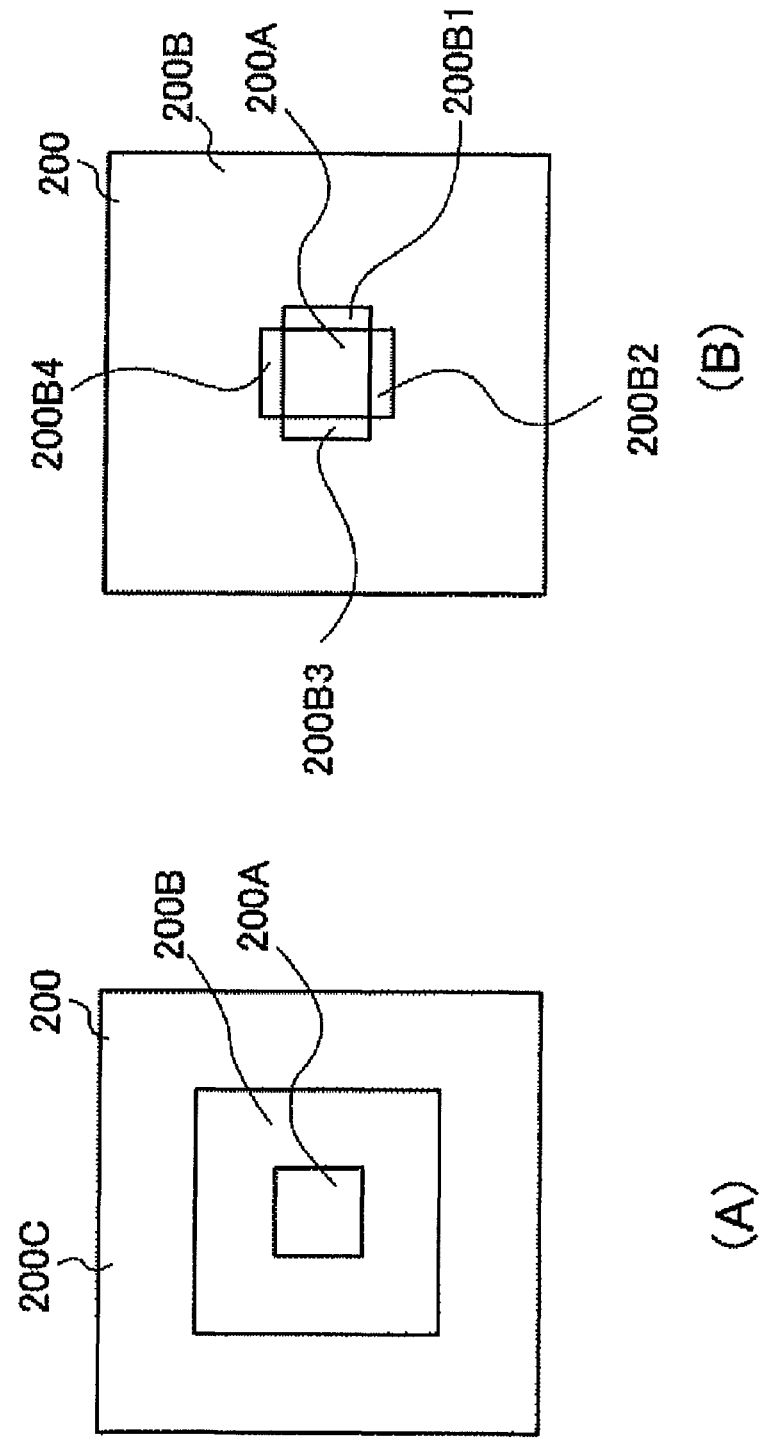
FIGS. 9(A) and 9(B) are diagrams illustrating a different division wavelength plate in the first embodiment.

In addition, in this embodiment, the division wavelength plate 200 is driven. As a result, a method of driving the optical information recording medium 300 according to the first embodiment with high precision can be executed at a high speed. In this embodiment, the division wavelength plate 200 is illustrated in FIG. 4, but the division wavelength plate 200 is not limited thereto. For example, as illustrated in FIG. 9(A), even though a region 200C is provided and used as a light shielding region, the same effect is obtained. In addition, as illustrated in FIG. 9(B), regions 200B1, 200B2, 200B3, and 200B4 may be provided. In this case, the regions 200B1, 200B2, 200B3, and 200B4 are used as polarizing diffraction elements and hologram elements and reproduced light diffracted by the regions 200B1, 200B2, 200B3, and 200B4 may be detected by the light detector 55. In this way, because sizes of the light receiving units detecting the diffracted light of the regions 200B1, 200B2, 200B3, and 200B4 can be increased, a position deviation allowance amount according to a temperature or a temporal change of the light detector 55 can be alleviated.

In addition, the polarization of the reproduced light incident on the regions 200B1, 200B2, 200B3, and 200B4 may be converted and the reproduced light may be refracted by the structure of the division wavelength plate. In this way, the position deviation allowance amount according to the temperature or the temporal change of the light detector 55 can be alleviated. When a propagation light of the reproduced light is changed like the diffraction and the refraction, a light receiving unit pattern may be determined according to diffraction and refraction amounts and directions and any light receiving unit pattern may be used. In addition, as illustrated in FIG. 9(B), if reproduced light of at least two regions instead of the four regions is detected, the same effect can be obtained. In addition, in this embodiment, the PBS prism 51 is used to branch the light passing through the region 200A of the division wavelength plate 200 and the light passing through the region 200B or the regions 200B1, 200B2, 200B3, and 200B4. However, the present invention is not limited thereto and a polarizing mirror may be used.

Here, in this embodiment, the region 200A of the division wavelength plate 200 is used as the transmission region and the region 200B is used as the ½ wavelength plate region. However, the present invention is not limited thereto and the same effect is obtained in the case of using a division wavelength plate emitting two polarized light substantially orthogonal to each other when the same reproduced light is incident.

Figure 10:
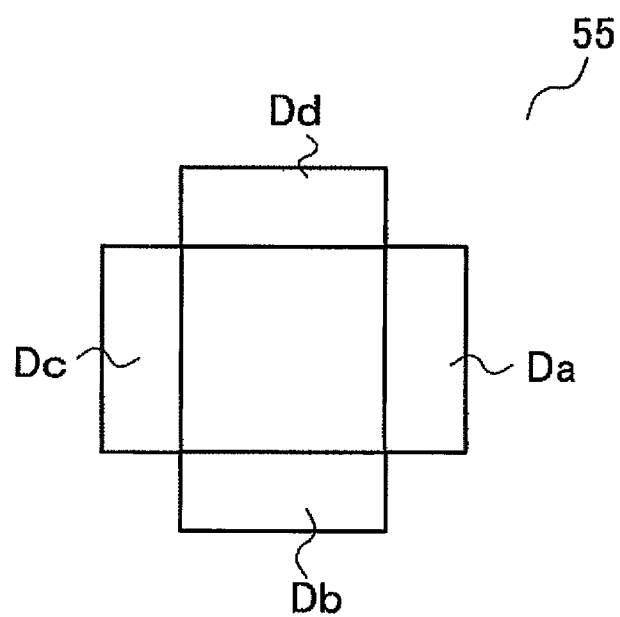
FIG. 10 is a diagram illustrating a different light detector in the first embodiment.

In addition, in this embodiment, the light receiving unit pattern illustrated in FIG. 5 is used. However, the present invention is not limited thereto and a light receiving unit pattern illustrated in FIG. 10 may be used. In addition, FIGS. 5 and 10 illustrate the four light receiving units. However, if at least two light receiving units exist, the same effect can be obtained.

In addition, for the specific driving method of the division wavelength plate 200, a stepping motor or a magnetic driving method may be used. In this embodiment, the optical system illustrated in FIG. 2 is used. However, the PBS prism 51 and a detection system may be disposed between the division wavelength plate 200 and the relay lens 30. By using this optical system, miniaturization can be realized. In addition, the PBS prism 51 is disposed immediately after the division wavelength plate 200, so that the detection lens 54 can be removed.

In addition, a width of the region 200A of the division wavelength plate 200 may be smaller than an opening width of the opening 100. Thereby, because the reproduced light is incident on the light detector 55 at the time of the reproduction, S/N of the position error signal can be improved.

In addition, in this embodiment, the division wavelength plate 200 can be driven in the optical axis direction and the plane direction vertical to the optical axis. However, if the division wavelength plate 200 is driven with at least one axis, the effect of this embodiment is obtained. In addition, in this embodiment, ZPES is calculated by a sum signal of the four light receiving units of the light detector. However, the same effect is obtained even though control is executed such that one signal of the signals A, B, C, and D is minimized.

Second Embodiment

Figure 11:
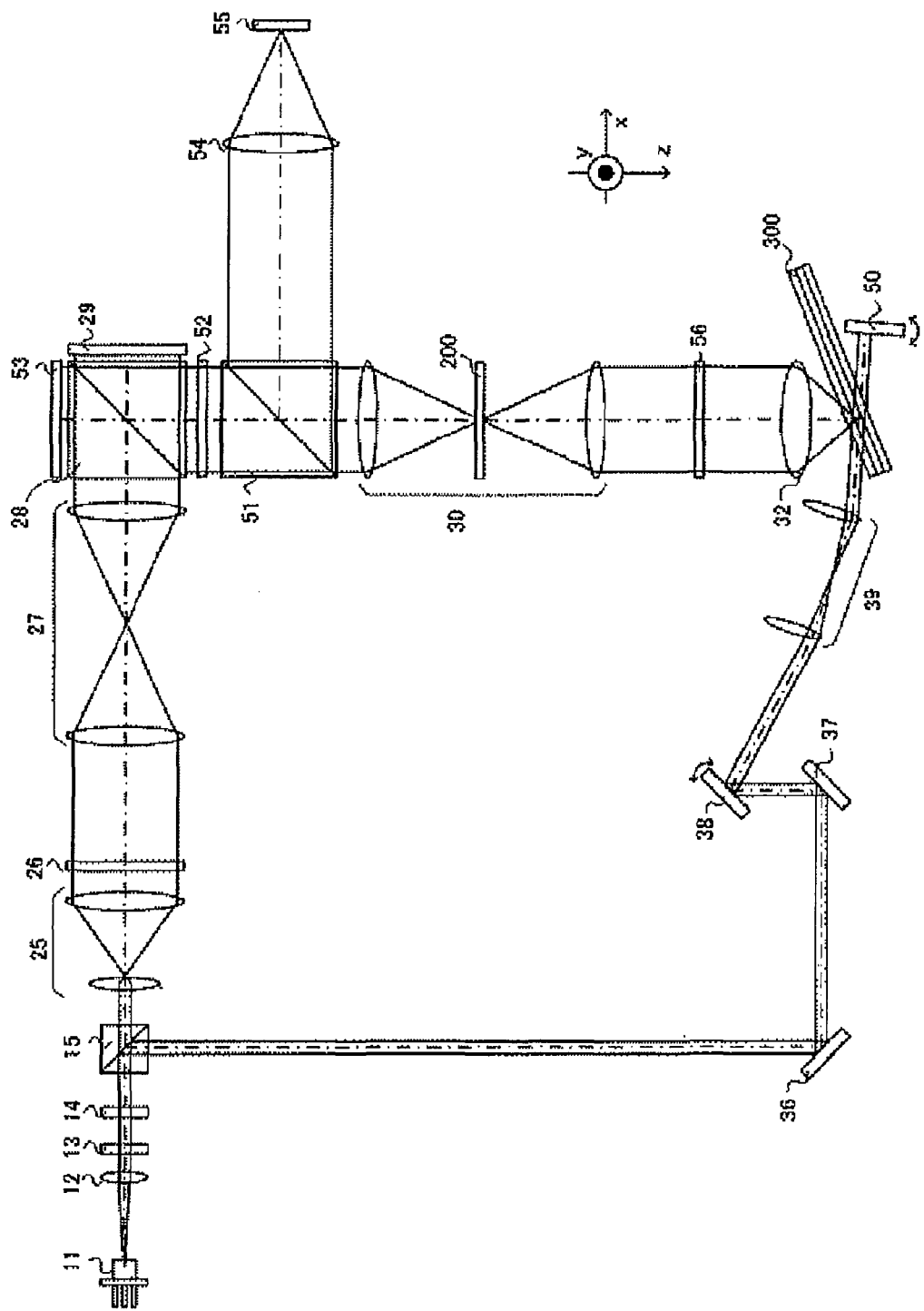
FIG. 11 is a diagram illustrating an optical system in a second embodiment.

FIG. 11 illustrates an optical system of an optical pickup device 60 in a hologram reproducing apparatus of a two-beam angle multiplex system according to a second embodiment of the present invention. In the first embodiment, the configuration in which the opening 100 and the division wavelength plate 200 are switched is adopted. However, in this embodiment, a configuration using the division wavelength plate 200 and a polarizer 56 is adopted. In addition, a function of recording information on an optical information recording medium is included. Because the other configuration is the same as the configuration of the first embodiment, a recording method of this embodiment different from the recording method of the first embodiment will be described using FIG. 11.

A light beam emitted from a semiconductor laser 11 is incident on a collimation lens 12, a shutter 13, a polarization variable element 14, and a PBS prism 15 and the light beam is branched into signal light and reference light by the PBS prism 15.

The signal light passing through the PBS prism 15 is incident on the division wavelength plate 200 via a beam expander 25, a phase mask 26, a relay lens 27, a PBS prism 28, a spatial light modulator 29, the PBS prism 28, a polarization variable element 52, a PBS prism 51, and a relay lens 30.

FIG. 4 illustrates the division wavelength plate 200. The division wavelength plate 200 is provided with regions 200A and 200B and the regions 200A and 200B become a transmission region and a ½ wavelength plate region, respectively. The reproduced light emitted from the region 200A is emitted in the same state as incident polarized light and the reproduced light emitted from the region 200B is emitted as polarized light different from the incident polarized light. The signal light emitted from the division wavelength plate 200 is incident on the polarizer 56 via the relay lens 30. The polarizer 56 is an optical element through which only predetermined polarized light passes. For this reason, only the signal light passing through the region 200A of the division wavelength plate 200 passes through the polarizer 56. The signal light passing through the polarizer 56 is condensed in the optical information recording medium 300 via an objective lens 32.

Meanwhile, the reference light reflected on the PBS prism 15 is incident on the optical information recording medium 300 via a mirror 36, a mirror 37, a galvano mirror 38, and a scanner lens 39, similar to the first embodiment.

An interference fringe pattern is formed in the optical information recording medium 300 by the signal light and the reference light and the interference fringe pattern is recorded as a hologram on the optical information recording medium 300.

After the information is recorded on the optical information recording medium 300, the shutter 13 is closed and next recorded information is displayed by the spatial light modulator 29. At the same time, the galvano mirror 38 rotates by a minute amount and an incidence angle of the reference light on the optical information recording medium 300 changes. Then, if the shutter 13 is opened, next recorded information is recorded at the same position of the optical information recording medium 300 at an angle different from a previous recording angle. By repeating this, angle multiplexing recording is performed.

As described above, recording is performed. In addition, in reproduction according to this embodiment, similar to the first embodiment, a position error signal is generated on the basis of a signal from the light detector 55 of FIG. 5 and the division wavelength plate 200 is controlled. In addition, order of control of the division wavelength plate 200 and a control flow at the time of the reproduction may be the same as the first embodiment.

In this way, in this embodiment, the division wavelength plate 200 is controlled on the basis of the position error signal and reproduced light and other diffracted light are separated. In addition, in the case of this embodiment, the division wavelength plate 200 and the polarizer 56 are used to remove a high frequency component of the signal light added by the spatial light modulator 29 at the time of the recording. For this reason, miniaturization is enabled with respect to the first embodiment.

The configuration of this embodiment is the same as the configuration of the first embodiment, except for the division wavelength plate 200 and the polarizer 56. Therefore, similar to the first embodiment, even though the configuration is changed, the same effect is obtained.

In addition, a ¼ wavelength plate may be disposed between the optical information recording medium 300 and the galvano mirror 50, so that the reference light reflected on the optical information recording medium 300 is not incident on an imaging element 53 or a light detector 55. Thereby, because the light reflected on the optical information recording medium 300 and the polarized light of the reproduced light can be orthogonal to each other, the reflected light of the optical information recording medium 300 can be shielded by the polarizer 56. In this case, a polarization variable element may be disposed in an optical path from the PBS prism 15 to the optical information recording medium 300 or an optical path from the optical information recording medium 300 to the PBS prism 51, such that the reproduced light is incident on the imaging element 53.

In addition, in FIG. 11, the polarizer 56 has a plate shape. However, the present invention is not limited thereto and a PBS prism may be used. In addition, other optical component may be controlled using light reflected on the PBS prism. For example, an emitted light amount of a semiconductor laser 11 may be controlled using the reflected light of the optical information recording medium 300.

Third Embodiment

Figure 12:
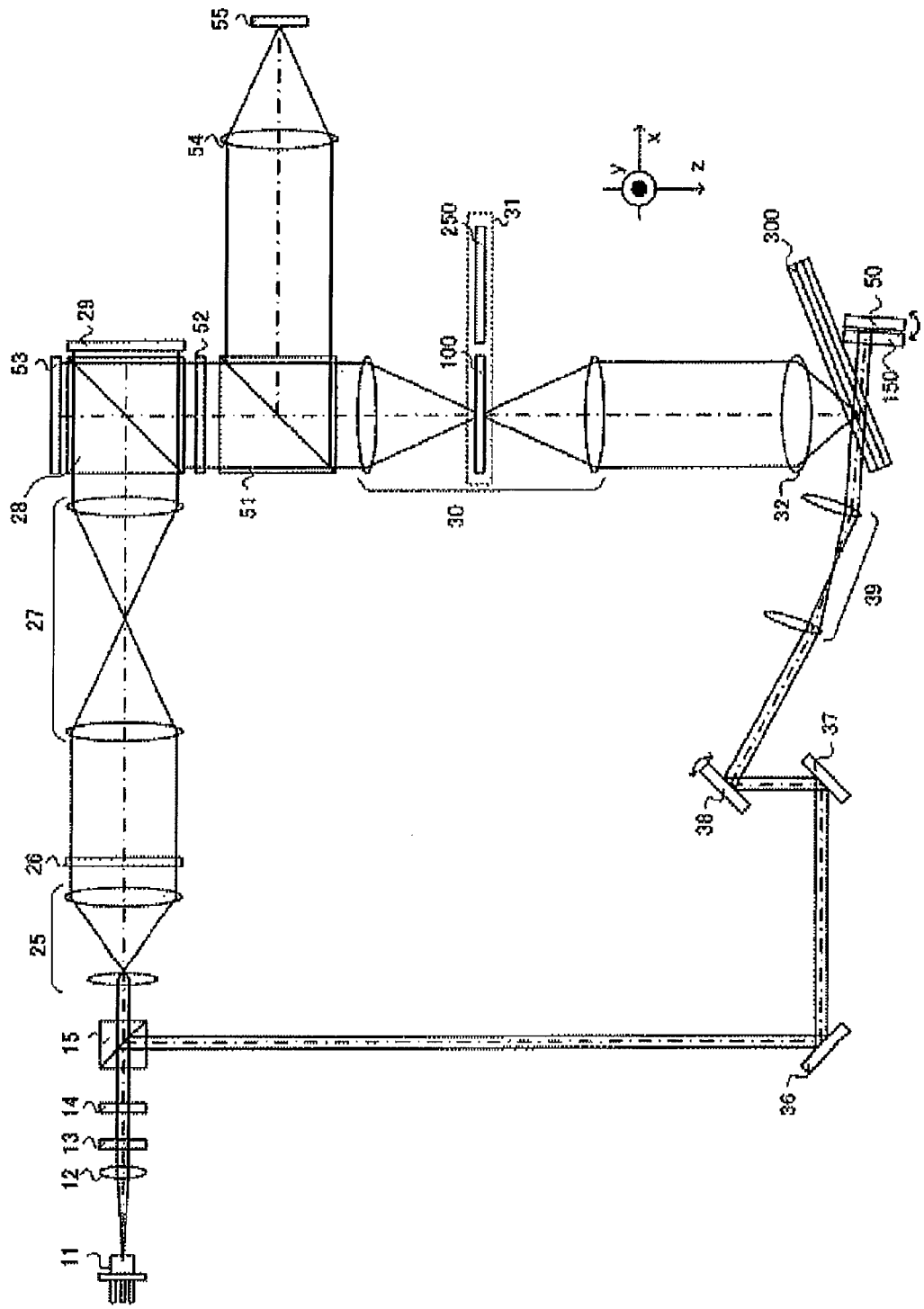
FIG. 12 is a diagram illustrating an optical system in a third embodiment.

FIG. 12 illustrates an optical system of an optical pickup device 60 in a hologram reproducing apparatus of a two-beam angle multiplex system according to a third embodiment of the present invention. In this embodiment, the division wavelength plate 200 according to the first embodiment is changed to a polarizing division diffraction grating 250 and a wavelength plate 150 is disposed between an optical information recording medium 300 and a galvano mirror 50. The other configuration is the same as the configuration of the first embodiment. Therefore, in this embodiment, a reproducing method of content different from the content of the first embodiment will be described using FIG. 12 and other diagrams.

First, switching is performed from an opening 100 to the polarizing division diffraction grating 250. A light beam emitted from a semiconductor laser 11 is incident on the optical information recording medium 300 again via a collimation lens 12, a shutter 13, a polarization variable element 14, a PBS prism 15, a mirror 36, a mirror 37, a galvano mirror 38, a scanner lens 39, the optical information recording medium 300, the wavelength plate 150, the galvano mirror 50, and the wavelength plate 150. Here, when reference light passes through the wavelength plate 150 two times, an S-polarized light component of the reference light is converted into polarized light components of S-polarized light and P-polarized light.

In addition, reproduced light and other diffracted light are generated from the optical information recording medium 300. At this time, because the reproduced light and other diffracted light are the same polarized light as the reference light, the reproduced light and other diffracted light become polarized light components of P-polarized light and S-polarized light.

The reproduced light and other diffracted light are incident on the polarizing division diffraction grating 250 in a relay lens 30 via an objective lens 32. Here, the polarizing division diffraction grating 250 can be driven in an optical axis direction and a plane direction vertical to an optical axis.

Figure 13:
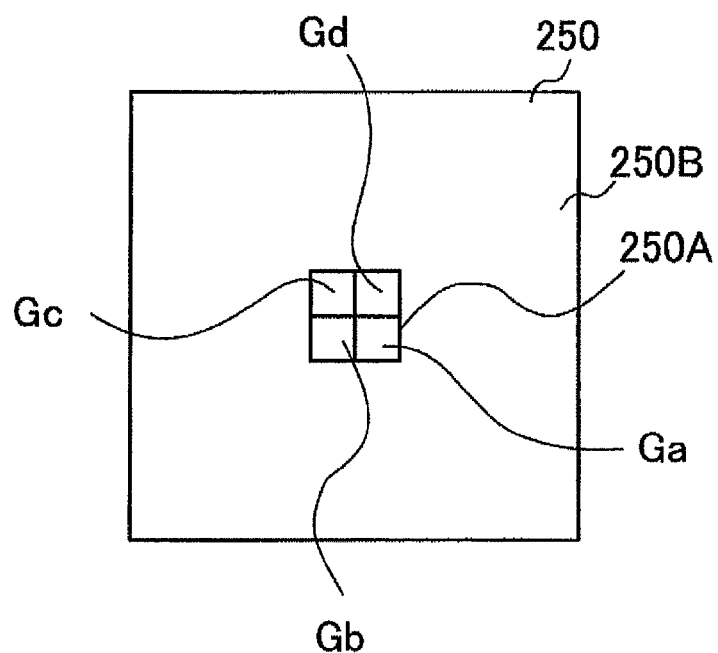
FIG. 13 is a diagram illustrating a polarization division diffraction element in the third embodiment.

The polarizing division diffraction grating 250 is a polarization diffraction element or a polarizing hologram element and is an element diffracting only predetermined polarized light. FIG. 13 illustrates a pattern of the polarizing division diffraction grating 250. The polarizing division diffraction grating 250 is provided with regions 250A and 250B and the regions 250A and 250B become a polarization division diffraction element region and a light shielding region, respectively. In addition, the region 250A is divided into four regions Ga, Gb, Gc, and Gd.

An S-polarized light component of reproduced light incident on the polarizing division diffraction grating 250 passes through the polarizing division diffraction grating 250 and a P-polarized light component is diffracted for each of the regions Ga, Gb, Gc, and Gd of the polarizing division diffraction grating 250. In addition, because other diffracted light is incident on the region 250B, other diffracted light does not pass through the polarizing division diffraction grating 250. As a result, the reproduced light and other diffracted light can be separated.

In addition, the reproduced light emitted from the polarizing division diffraction grating 250 passes through the relay lens 30 and is incident on a PBS prism 51. At this time, the reproduced light passing through the polarizing division diffraction grating 250 is incident on an imaging element 53 via the PBS prism 51, a polarization variable element 52, and a PBS prism 28.

In addition, reproduction image data is generated on the basis of the reproduced light incident on the imaging element 53. The reproduced light diffracted by the polarizing division diffraction grating 250 is reflected on the PBS prism 51 and is incident on the light detector 55 via the detection lens 54.

Next, the galvano mirror 38 rotates by a minute amount and an incidence angle of the reference light on the optical information recording medium 300 changes. As a result, reproduction image data of a next page of a different angle in the optical information recording medium is reproduced. In addition, when reproduction of a predetermined book ends, the optical information recording medium 300 and the polarizing division diffraction grating 250 are controlled on the basis of position error signals and reproduction of a next book is performed.

Figure 14:
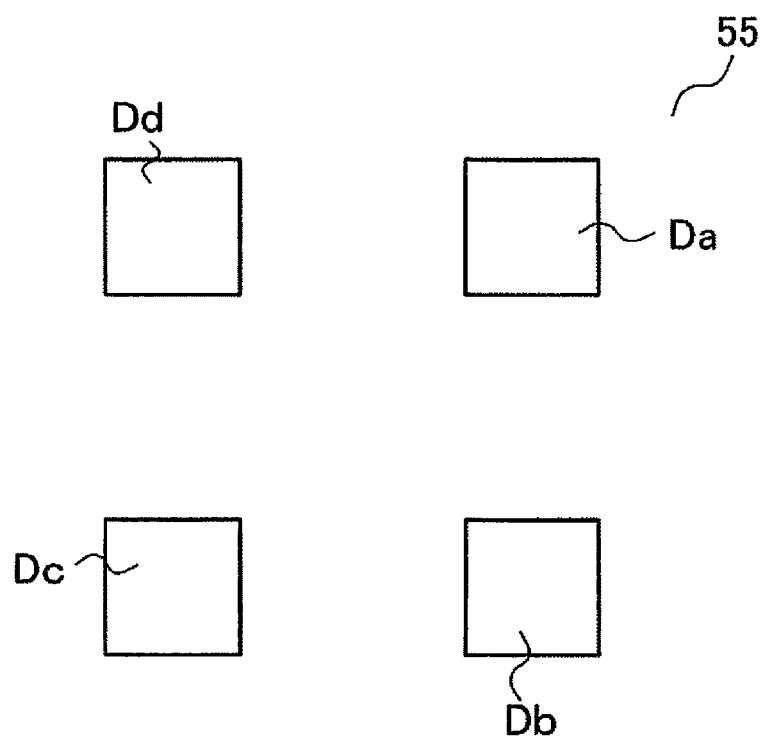
FIG. 14 is a diagram illustrating a light detector in the third embodiment.

Here, a detection method of the position error signal according to this embodiment will be described. FIG. 14 illustrates the light detector 55. The light detector 55 has four light receiving units Da, Db, Dc, and Dd. In addition, the reproduced light diffracted by the regions Ga, Gb, Gc, and Gd of the polarizing division diffraction grating 250 is incident on the light receiving units Da, Db, Dc, and Dd. When signals detected by the light receiving units Da, Db, Dc, and Dd are set as signals A, B, C, and D, position error signals XPES, YPES, and ZPES of the optical information recording medium 300 are represented as follows.

$$XPES = A - C$$

$$YPES = B - D$$

$$ZPES = A + B + C + D \qquad \text{[MATH. 1]}$$

Figure 15:
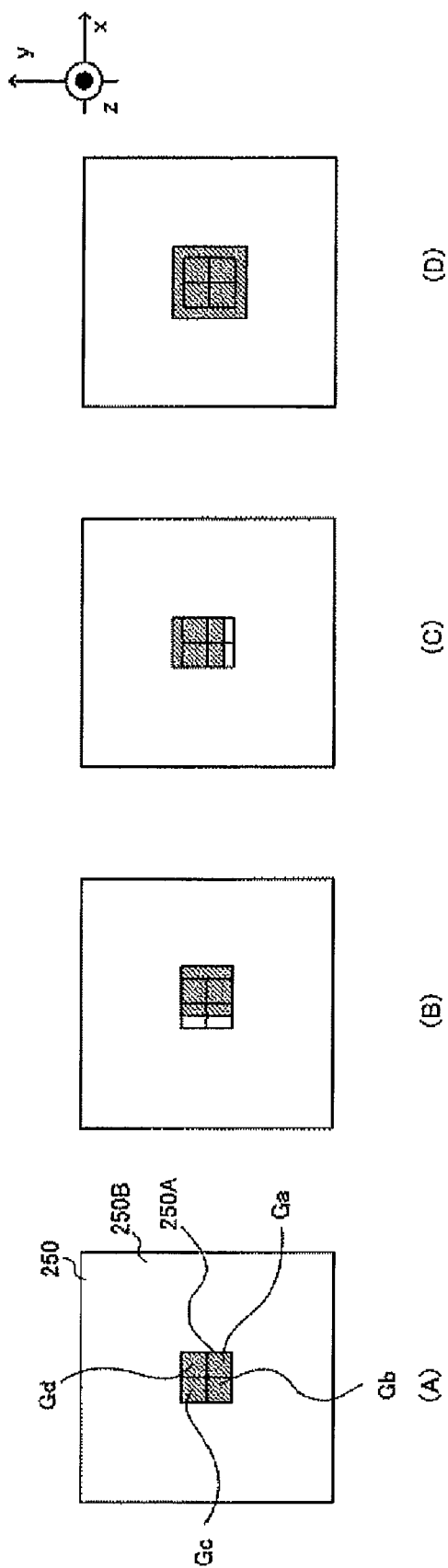
FIG. 15 is diagrams illustrating a detection method of a position error signal in the third embodiment.

FIGS. 15(A) to 15(D) illustrate the polarizing division diffraction grating 250 in the case in which a position of a book to be reproduced is deviated with respect to the objective lens. FIGS. 15(A), (B), (C), and (D) illustrate the case in which the position of the book to be reproduced is optimal with respect to the objective lens, the case in which the position is deviated in an x direction, the case in which the position is deviated in a y direction, and the case in which the position is deviated in a z direction, respectively. In addition, regions shown by oblique lines in the drawings show the reproduced light.

In the optimal case, the reproduced light is incident on the region 250A of the polarizing division diffraction grating 250. However, when the position is deviated in the x and y directions, the reproduced light is incident on a position deviated from the region 250A. For this reason, differences occur in amounts of reproduced light diffracted by the regions Ga, Gb, Gc, and Gd. The differences of the light amounts are operated as XPES and YPES, so that the position error signals can be generated. Because XPES and YPES may be controlled to become symmetrical, the polarizing division diffraction grating 250 is preferably controlled such that voltages become zero.

In addition, when the position is deviated in the z direction, amounts of the reproduced light diffracted by the regions Ga, Gb, Gc, and Gd decrease, because the reproduced light is incident on the region 250B of the polarizing division diffraction grating 250. For this reason, the polarizing division diffraction grating 250 is preferably controlled such that the position error signal of ZPES has a maximum value.

As such, in this embodiment, control of the polarizing division diffraction grating 250 is executed using XPES, YPES, and ZPES. As a result, in this embodiment, high-speed control can be executed with respect to Patent Literature 1. In addition, in the case of the first embodiment, a light amount of the light detector 55 decreases at the time of the reproduction. Meanwhile, in the case of this embodiment, the light amount of the light detector is maximized at the time of the reproduction. From the viewpoint of S/N, this embodiment is advantageous.

In addition, order of control of the polarizing division diffraction grating 250 and a control flow at the time of the reproduction may be the same as the first embodiment.

In this way, in this embodiment, the polarizing division diffraction grating 250 is controlled on the basis of the position error signal and reproduced light and other diffracted light are separated. In addition, the configuration of this embodiment is the same as the configuration of the first embodiment, except for the polarizing division diffraction grating 250. Therefore, similar to the first embodiment, even though the configuration is changed, the same effect is obtained.

Here, the region 250A and the region 250B of the polarizing division diffraction grating 250 may be elements obtained by combining a polarization diffraction element and an opening. In this embodiment, the light detector 55 is illustrated in FIG. 14. However, the present invention is not limited thereto and any pattern capable of detecting the reproducing light branched by the polarizing division diffraction grating 250 may be used. In addition, in this embodiment, the region 250A of the polarizing division diffraction grating 250 is divided into the four regions. However, if the region 250A is divided into at least two regions, the same effect can be obtained. In addition, a ¼ wavelength plate may be disposed between the optical information recording medium 300 and the galvano mirror 50, so that the reference light reflected on the optical information recording medium 300 is not incident on the imaging element 53 or the light detector 55.

Thereby, because the light reflected on the optical information recording medium 300 and the polarized light of the reproduced light can be orthogonal to each other, the reflected light of the optical information recording medium 300 can be shielded by the polarizer 56. In this case, a polarization variable element may be disposed in an optical path from the PBS prism 15 to the optical information recording medium 300 or an optical path from the optical information recording medium 300 to the PBS prism 51, such that the reproduced light is incident on the imaging element 53.

Fourth Embodiment

Figure 16:
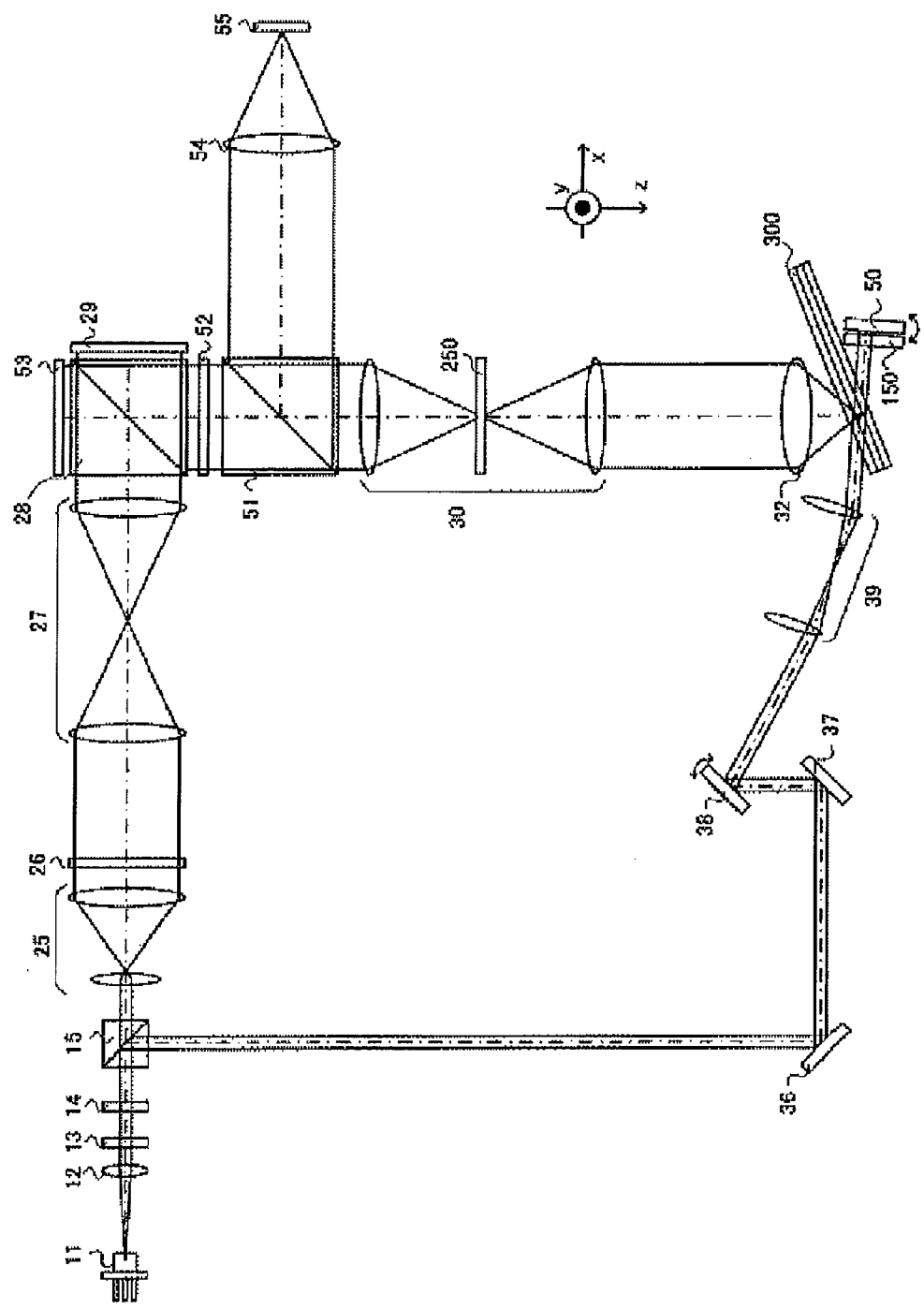
FIG. 16 is a diagram illustrating an optical system in a fourth embodiment.

FIG. 16 illustrates an optical system of an optical pickup device 60 in a hologram reproducing apparatus of a two-beam angle multiplex system according to a fourth embodiment of the present invention. In the third embodiment, the configuration in which the opening 100 and the polarizing division diffraction grating 250 are switched is adopted. However, in this embodiment, a configuration using only the polarizing division diffraction grating 250 is adopted. Because the other configuration is the same as the configuration of the third embodiment, in this embodiment, a recording method different from the recording method of the third embodiment will be described using FIG. 16.

A light beam emitted from a semiconductor laser 11 is incident on a collimation lens 12, a shutter 13, a polarization variable element 14, and a PBS prism 15 and the light beam is branched into signal light and reference light by the PBS prism 15.

The signal light passing through the PBS prism 15 is incident on the polarizing division diffraction grating 250 via a beam expander 25, a phase mask 26, a relay lens 27, a PBS prism 28, a spatial light modulator 29, the PBS prism 28, a polarization variable element 52, a PBS prism 51, and a relay lens 30.

The polarizing division diffraction grating 250 is a polarization diffraction element or a polarizing hologram element and is an element diffracting only predetermined polarized light. FIG. 13 illustrates a pattern of the polarizing division diffraction grating 250. The polarizing division diffraction grating 250 is provided with regions 250A and 250B and the regions 250A and 250B become a polarization division diffraction element region and a light shielding region, respectively. In addition, the region 250A is divided into four regions Ga, Gb, Gc, and Gd.

Because the signal light incident on the polarizing division diffraction grating 250 is S-polarized light, the signal light passes through the polarizing division diffraction grating 250 and is condensed in an optical information recording medium 300 via the relay lens 30 and an objective lens 32.

Meanwhile, the reference light reflected on the PBS prism 15 is incident on the optical information recording medium 300 via a mirror 36, a mirror 37, a galvano mirror 38, and a scanner lens 39, similar to the first embodiment.

An interference fringe pattern is formed in the optical information recording medium 300 by the signal light and the reference light and the interference fringe pattern is recorded as a hologram.

After the information is recorded on the optical information recording medium 300, the shutter 13 is closed and next recorded information is displayed by the spatial light modulator 29. At the same time, the galvano mirror 38 rotates by a minute amount and an incidence angle of the reference light on the optical information recording medium 300 changes. Then, if the shutter 13 is opened, next recorded information is recorded at the same position of the optical information recording medium 300 at an angle different from a previous recording angle. By repeating this, angle multiplexing recording is performed.

As described above, recording is performed. In addition, in reproduction according to this embodiment, similar to the third embodiment, a position error signal is generated on the basis of a signal from the light detector 55 of FIG. 14 and the polarizing division diffraction grating 250 is controlled. In addition, order of control of the polarizing division diffraction grating 250 and a control flow at the time of the reproduction may be the same as the first embodiment.

In this way, in this embodiment, the polarizing division diffraction grating 250 is controlled on the basis of the position error signal and reproduced light and other diffracted light are separated. In addition, in the case of this embodiment, the polarizing division diffraction grating 250 is used to remove a high frequency component of the signal light added by the spatial light modulator 29 at the time of the recording. For this reason, miniaturization is enabled with respect to the third embodiment.

The configuration of this embodiment is the same as the configuration of the third embodiment, except for the polarizing division diffraction grating 250. Therefore, similar to the third embodiment, even though the configuration is changed, the same effect is obtained.

Fifth Embodiment

Figure 17:
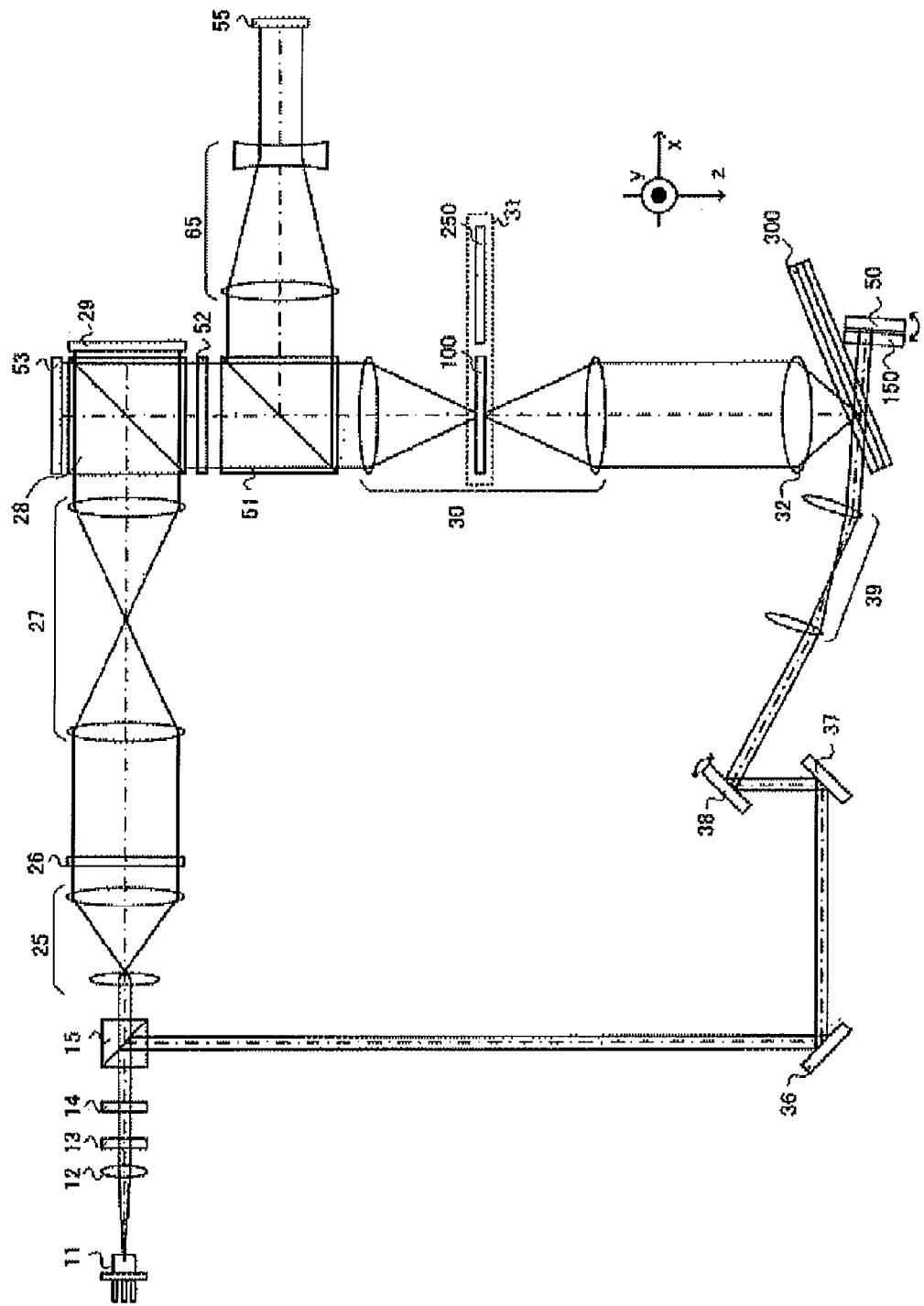
FIG. 17 is a diagram illustrating an optical system in a fifth embodiment.

FIG. 17 illustrates an optical system of an optical pickup device 60 in a hologram reproducing apparatus of a two-beam angle multiplex system according to a fifth embodiment of the present invention. In this embodiment, the detection lens 54 according to the third embodiment is changed to a beam expander 65.

The other configuration is the same as the configuration of the third embodiment. Therefore, in this embodiment, a reproducing method different from the reproducing method of the third embodiment will be described using FIG. 16 and other diagrams.

First, an opening 100 and a polarizing division diffraction grating 250 are switched. A light beam emitted from a semiconductor laser 11 is incident on an optical information recording medium 300 again via a collimation lens 12, a shutter 13, a polarization variable element 14, a PBS prism 15, a mirror 36, a mirror 37, a galvano mirror 38, a scanner lens 39, the optical information recording medium 300, a wavelength plate 150, a galvano mirror 50, and a wavelength plate 150. Here, when reference light passes through the wavelength plate 150, an S-polarized light component of the reference light is converted into polarized light components of S-polarized light and P-polarized light.

In addition, reproduced light and other diffracted light are generated from the optical information recording medium 300. At this time, because the reproduced light and other diffracted light are the same polarized light as the reference light, the reproduced light and other diffracted light become polarized light components of P-polarized light and S-polarized light.

The reproduced light and other diffracted light are incident on the polarizing division diffraction grating 250 in a relay lens 30 via an objective lens 32. Here, the polarizing division diffraction grating 250 can be driven in an optical axis direction and a plane direction vertical to an optical axis.

The polarizing division diffraction grating 250 is a polarization diffraction element or a polarizing hologram element and is an element diffracting only predetermined polarized light. FIG. 13 illustrates a pattern of the polarizing division diffraction grating 250.

The S-polarized light component of the reproduced light incident on the polarizing division diffraction grating 250 passes through the polarizing division diffraction grating 250 and the P-polarized light component is diffracted for each of regions Ga, Gb, Gc, and Gd of the polarizing division diffraction grating 250. In addition, because other diffracted light is incident on the region 250B, other diffracted light does not pass through the polarizing division diffraction grating 250. As a result, the reproduced light and other diffracted light can be separated.

In addition, the reproduced light emitted from the polarizing division diffraction grating 250 passes through the relay lens 30 and is incident on a PBS prism 51. At this time, the reproduced light passing through the polarizing division diffraction grating 250 is incident on an imaging element 53 via the PBS prism 51, a polarization variable element 52, and a PBS prism 28.

In addition, reproduction image data is generated on the basis of the reproduced light incident on the imaging element 53. The reproduced light diffracted by the polarizing division diffraction grating 250 is reflected on the PBS prism 51 and is incident on a light detector 55 via the beam expander 65.

Next, the galvano mirror 38 rotates by a minute amount and an incidence angle of the reference light on the optical information recording medium 300 changes. As a result, reproduction image data of a next page of a different angle in the optical information recording medium 300 is reproduced. In addition, when reproduction of a predetermined book ends, the optical information recording medium 300 and the polarizing division diffraction grating 250 are controlled on the basis of position error signals and reproduction of a next book is performed.

Figure 18:
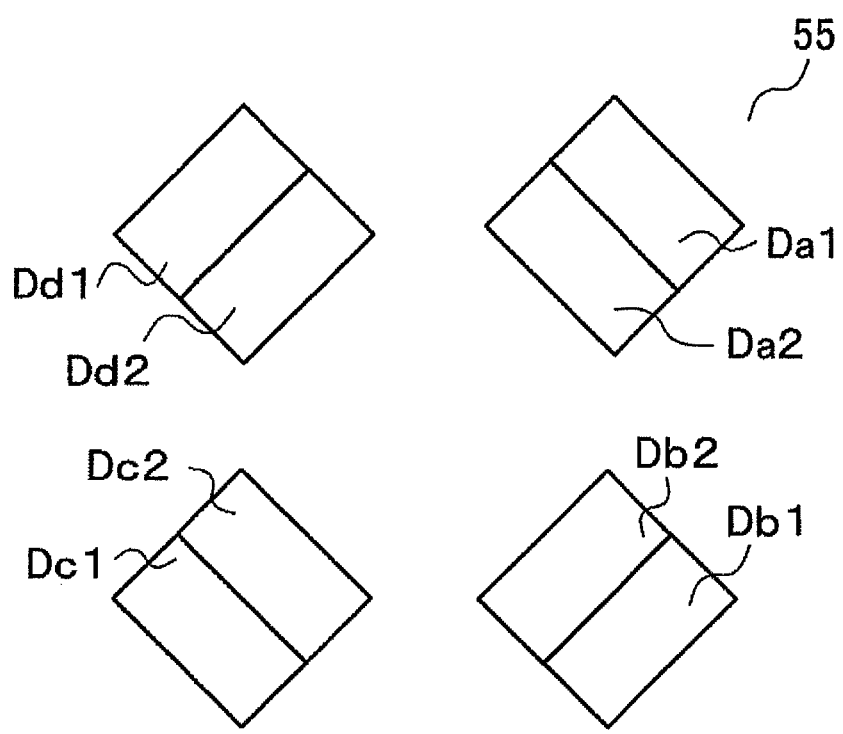
FIG. 18 is a diagram illustrating a light detector in the fifth embodiment.

Here, a detection method of the position error signal according to this embodiment will be described. FIG. 18 illustrates the light detector 55. The light detector 55 has eight light receiving units Da1, Da2, Db1, Db2, Dc1, Dc2, Dd1, and Dd2. In addition, the reproduced light diffracted by the region Ga of the polarizing division diffraction grating 250 is incident on the light receiving units Da1 and Da2, the reproduced light diffracted by the region Gb is incident on the light receiving units Db1 and Db2, the reproduced light diffracted by the region Gc is incident on the light receiving units Dc1 and Dc2, and the reproduced light diffracted by the region Gd is incident on the light receiving units Dd1 and Dd2. Here, when signals detected by the light receiving units Da1, Da2, Db1, Db2, Dc1, Dc2, Dd1, and Dd2 are set as signals A1, A2, B1, B2, C1, C2, D1, and D2, position error signals XPES, YPES, and ZPES of the optical information recording medium 300 are represented as follows.

$$XPES=(A1+A2)-(C1+C2)$$

$$YPES=(B1+B2)-(D1+D2)$$

$$ZPES=(A1+B1+C1+D1)-(A2+B2+C2+D2) \quad \text{[MATH. 2]}$$

Here, for deviations of x and y directions of the polarizing division diffraction grating 250, position error signals can be detected by the same reason as the third embodiment. For a z direction, the description is given below.

Figure 19:
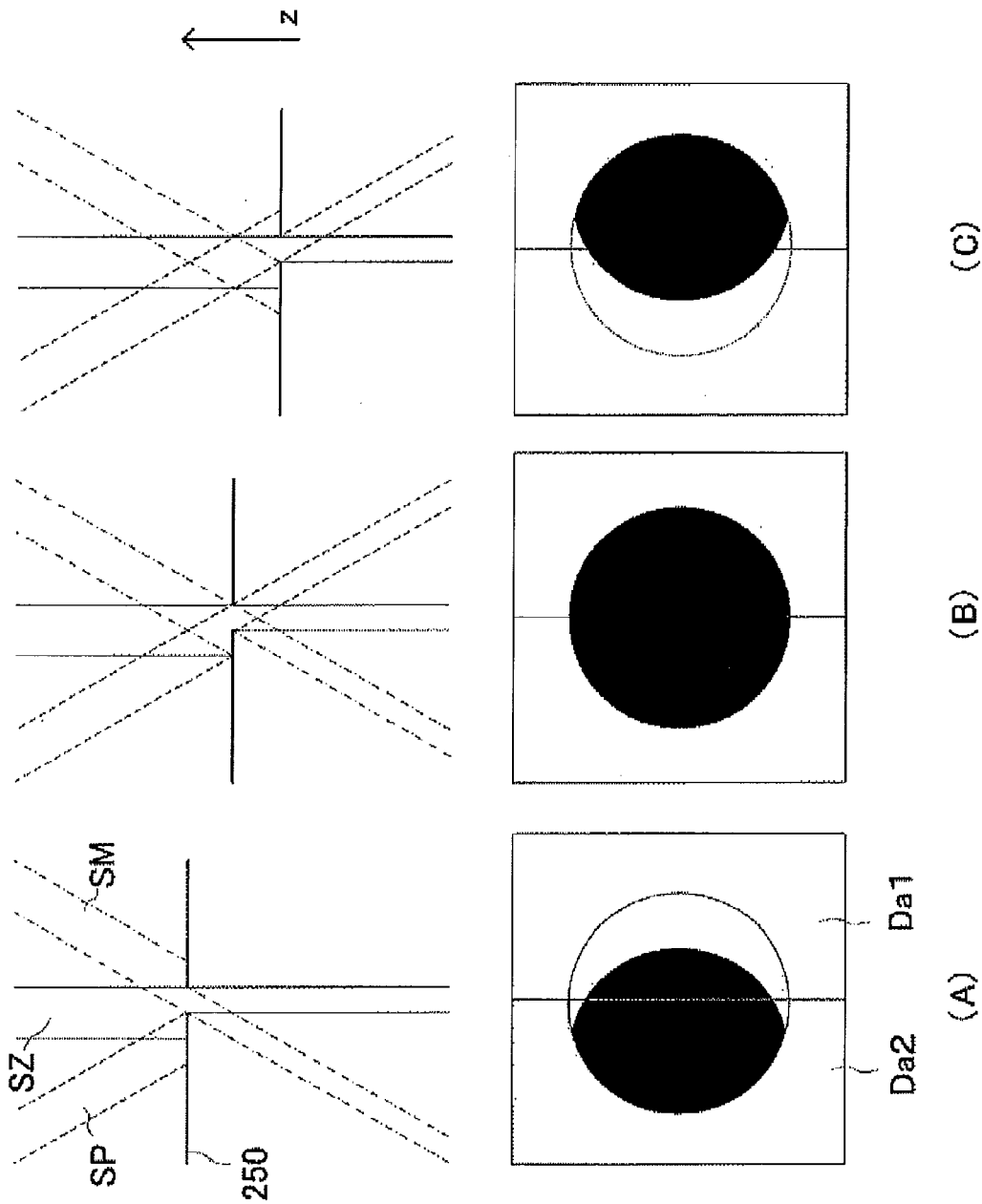
FIG. 19 is diagrams illustrating a detection method of a position error signal in the fifth embodiment.

FIGS. 19(A) to 19(C) are schematic diagrams illustrating a relation of the region Ga of the polarizing division diffraction grating 250 and the light receiving units Da1 and Da2 of the light detector 55. FIGS. 19(A), (B), and (C) illustrate the case in which the polarizing division diffraction grating 250 is deviated in the z direction. (A) illustrates the case in which the polarizing division diffraction grating 250 is deviated to a plus side, (B) illustrates the case in which the polarizing division diffraction grating 250 is not deviated, and (C) illustrates the case in which the polarizing division diffraction grating 250 is deviated to a minus side. In addition, light beams SP, SZ, and SM show light beams of different incidence angles.

First, as illustrated in (B), in the case in which the polarizing division diffraction grating 250 is not deviated, because each of the light beams SP, SZ, and SM pass through the region Ga, images detected by Da1 and Da2 of the light detector 55 become images recorded by the original light spatial modulator 29. Meanwhile, as illustrated in (A), in the case in which the polarizing division diffraction grating 250 is deviated in a plus direction, the light beam SP becomes hard to pass through the region Ga. For this reason, in the images detected by the light receiving units Da1 and Da2 of the light detector 55, a region of a single side is cut. In the same way, as illustrated in (C), in the case in which the polarizing division diffraction grating 250 is deviated in a minus direction, in the images detected by the light receiving units Da1 and Da2 of the light detector 55, a region of an opposite side is cut.

Here, the description is given using the region Ga of the polarizing division diffraction grating 250. However, the regions Gb, Gc, and Gd are also the same. For this reason, the images are detected by the light receiving units Da1, Da2, Db1, Db2, Dc1, Dc2, Dd1, and Dd2 of the light detector 55, so that the position error detection signal of the z direction can be generated. In this embodiment, the above detection is performed, so that a position deviation direction can be detected with respect to the first to fourth embodiments. Therefore, control is preferably executed such that ZPES becomes zero.

In this description, the description is given using the polarizing division diffraction grating 250. However, the result is the same even when the optical information recording medium 300 is deviated in the z direction in a state in which the polarizing division diffraction grating 250 is fixed.

In this embodiment, similar to the third embodiment, the position error signal is generated on the basis of the signal from the light detector 55 of FIG. 17 and the polarizing division diffraction grating 250 is controlled. In addition, order of control of the polarizing division diffraction grating 250 and a control flow at the time of the reproduction may be the same as the first embodiment.

In this way, in this embodiment, the polarizing division diffraction grating 250 is controlled on the basis of the position error signal and reproduced light and other diffracted light are separated. In addition, the configuration of this embodiment is the same as the configuration of the third embodiment, except for the polarizing division diffraction grating 250. Therefore, similar to the third embodiment, even though the configuration is changed, the same effect is obtained.

Sixth Embodiment

Figure 20:
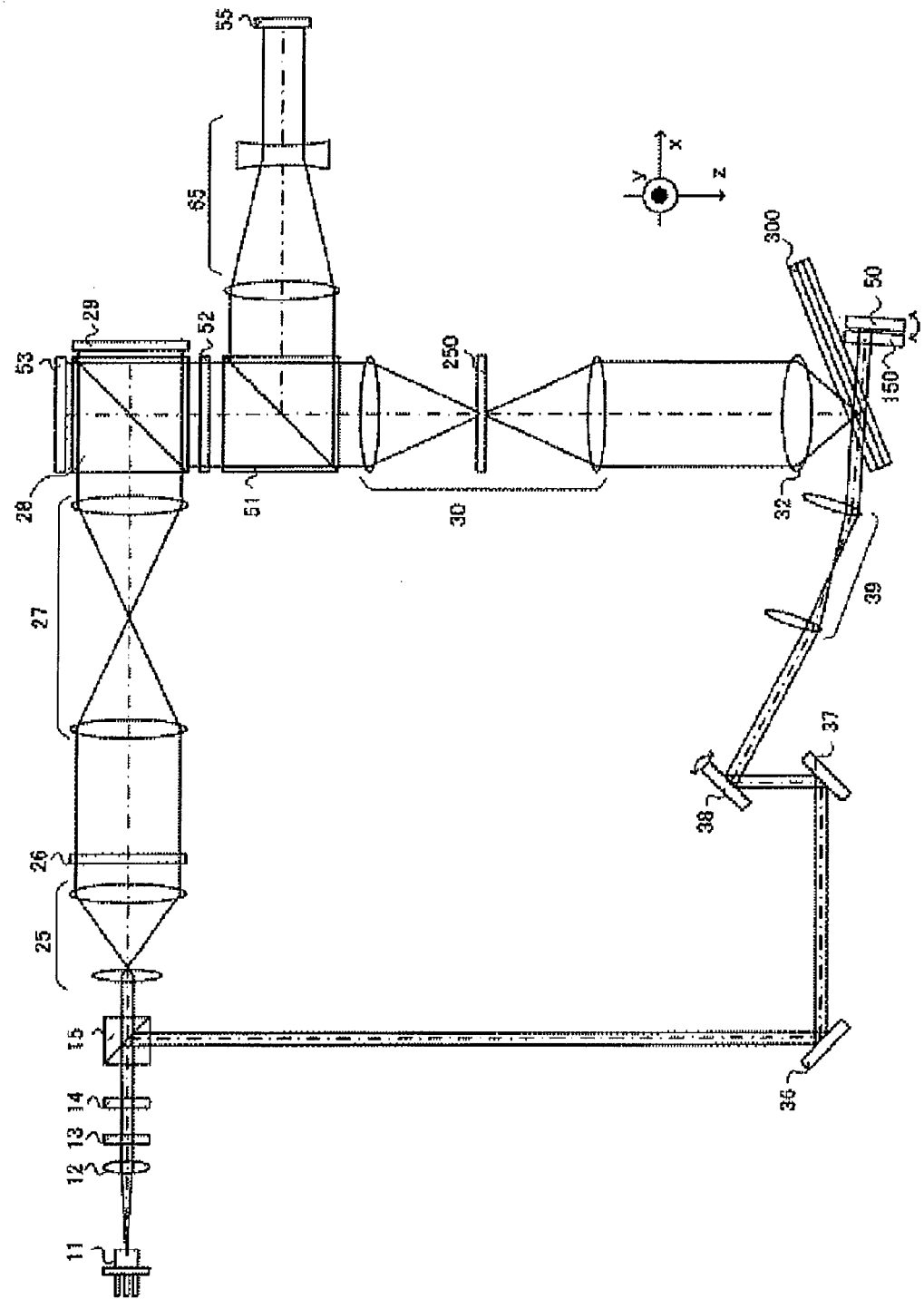
FIG. 20 is a diagram illustrating an optical system in a sixth embodiment.

FIG. 20 illustrates an optical system of an optical pickup device in a hologram reproducing apparatus of a two-beam angle multiplex system according to a sixth embodiment of the present invention. In the fifth embodiment, the configuration in which the opening 100 and the polarizing division diffraction grating 250 are switched is adopted. However, in this embodiment, a configuration using only the polarizing division diffraction grating 250 is adopted. The other configuration is the same as the configurations of the fourth and fifth embodiments. A recording method of this embodiment is the same as the recording method of the fourth embodiment and a reproducing method thereof is the same as the reproducing method of the fifth embodiment.

In this embodiment, similar to the fifth embodiment, a position error signal is generated on the basis of a signal from a light detector 55 of FIG. 20 and the polarizing division diffraction grating 250 is controlled. In addition, order of control of the polarizing division diffraction grating 250 and a control flow at the time of reproduction may be the same as the first embodiment.

In this way, in this embodiment, the polarizing division diffraction grating 250 is controlled on the basis of the position error signal and reproduced light and other diffracted light are separated. In addition, in the case of this embodiment, the polarizing division diffraction grating 250 is used to remove a high frequency component of signal light added by a spatial light modulator 29 at the time of recording. For this reason, miniaturization is enabled with respect to the fifth embodiment.

The configuration of this embodiment is the same as the configuration of the fifth embodiment, except for the polarizing division diffraction grating 250. Therefore, similar to the fifth embodiment, even though the configuration is changed, the same effect is obtained.

Seventh Embodiment

Figure 21:
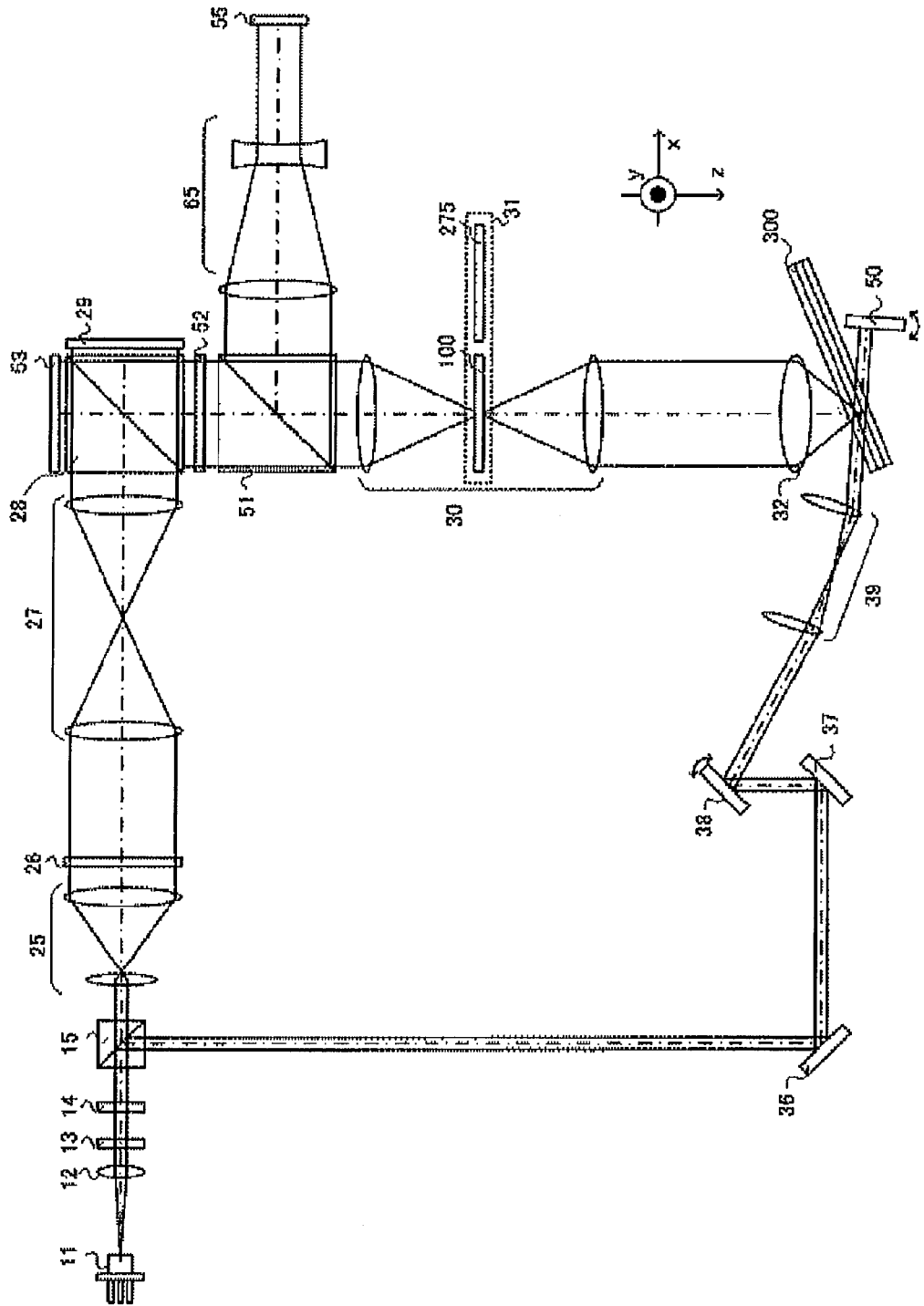
FIG. 21 is a diagram illustrating an optical system in a seventh embodiment.

FIG. 21 illustrates an optical system of an optical pickup device 60 in a hologram reproducing apparatus of a two-beam angle multiplex system according to a seventh embodiment of the present invention. In this embodiment, the polarizing division diffraction grating 250 according to the third embodiment is changed to an optical element 275 having a function of a wavelength plate and a function of a diffraction grating. In this embodiment, this element is called a wavelength plate division diffraction element 275.

The other configuration is the same as the configuration of the third embodiment. Therefore, in this embodiment, a reproducing method different from the reproducing method of the third embodiment will be described using FIG. 21 and other diagrams.

First, when reproduction is performed, an opening 100 and the wavelength plate division diffraction element 275 are switched. A light beam emitted from a semiconductor laser 11 is incident on an optical information recording medium 300 again via a collimation lens 12, a shutter 13, a polarization variable element 14, a PBS prism 15, a mirror 36, a mirror 37, a galvano mirror 38, a scanner lens 39, the optical information recording medium 300, and a galvano mirror 50. As a result, reproduced light and other diffracted light are generated from the optical information recording medium 300.

The reproduced light and other diffracted light are incident on the wavelength plate division diffraction element 275 in a relay lens 30 via an objective lens 32. Here, the wavelength plate division diffraction element 275 can be driven in an optical axis direction and a plane direction vertical to an optical axis.

Figure 22:
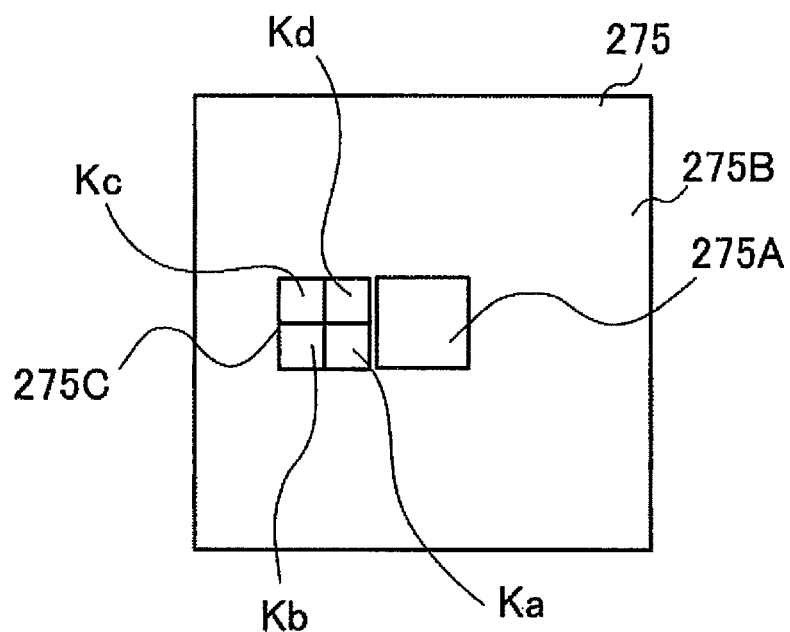
FIG. 22 is a diagram illustrating a wavelength plate division diffraction element in the seventh embodiment.

FIG. 22 illustrates a pattern of the wavelength plate division diffraction element 275. The wavelength plate division diffraction element 275 is provided with regions 275A, 275B, and 275C and the region 275A becomes a transmission region, the region 275B becomes a light shielding region, and the region 275C becomes a region having functions of a ½ wavelength plate and a diffraction element. In addition, the region 275C is divided into four regions Ka, Kb, Kc, and Kd.

The reproduced light incident on the wavelength plate division diffraction element 275 is incident on the region 275A and is emitted as it is. Next, the reproduced light emitted from the wavelength plate division diffraction element 275 passes through the relay lens 30 and is incident on an imaging element 53 via a PBS prism 51, a polarization variable element 52, and a PBS prism 28. In addition, reproduction image data is generated on the basis of the reproduced light incident on the imaging element 53.

In addition, diffracted light from one adjacent book incident on the wavelength plate division diffraction element 275 is incident on the region 275C and other diffracted light is incident on the region 275B. For this reason, only the diffracted light from one adjacent book in other diffracted light is emitted from the wavelength plate division diffraction element 275.

Here, polarization of the diffracted light from the adjacent book incident on the region 275C is converted and the diffracted light is diffracted. In addition, the diffracted light emitted from the region 275C is reflected on the PBS prism 51 and is incident on a light detector 55 via a detection lens 54.

Next, the galvano mirror 38 rotates by a minute amount and an incidence angle of the reference light on the optical information recording medium 300 changes. As a result, reproduction image data of a next page of a different angle in the optical information recording medium 300 is reproduced. In addition, when reproduction of a predetermined book ends, the optical information recording medium 300 and the wavelength plate division diffraction element 275 are controlled on the basis of a position error signal and reproduction of a next book is performed. At this time, a rotation angle of the galvano mirror 38 is adjusted such that the adjacent book is substantially maximized.

Here, a detection method of the position error signal according to this embodiment will be described. The detector according to this embodiment may have the light receiving unit arrangement of FIG. 14 illustrated in the third embodiment. The light detector 55 has four light receiving units Da, Db, Dc, and Dd. In addition, reproduced light diffracted by regions Ka, Kb, Kc, and Kd of the polarizing division diffraction grating 250 is incident on the light receiving units Da, Db, Dc, and Dd. When signals detected by the light receiving units Da, Db, Dc, and Dd are set as signals A, B, C, and D, position error signals XPES, YPES, and ZPES of the optical information recording medium 300 are represented as follows.

$$XPES = A - C$$
$$YPES = B - D$$
$$ZPES = A + B + C + D \qquad [\text{MATH. 1}]$$

An operation method is the same as the operation method of the third embodiment. In the third embodiment, the position error signal is generated using the reproduced light. In this embodiment, the position error signal is generated using the diffracted light from the adjacent book. By using this detection method, in this embodiment, because an amount of reproduced light obtained in the imaging element 53 can be increased with respect to the third embodiment, stable reproduction is performed. In addition, order of control of the wavelength plate division diffraction element 275 and a control flow at the time of the reproduction may be the same as the first embodiment. However, the seventh embodiment is different from the first embodiment in that, in the control flow at the time of the reproduction, the galvano mirrors 38 and 50 are adjusted by initial adjustment of S1, such that the diffracted light from the adjacent book is generated. Here, in this embodiment, only one book among the adjacent books is detected. However, a plurality of books may be detected and may be used for position control.

The configuration of this embodiment is almost the same as the configuration of the third embodiment, except for the wavelength plate division diffraction element 275. Therefore, similar to the third embodiment, even though the configuration is changed, the same effect is obtained. In addition, in this embodiment, for the diffracted light from the adjacent book, the position error signal is detected using the same method as the method of the third embodiment. However, the diffracted light from the adjacent book may be detected by using the same method as the method of the fifth embodiment.

The wavelength plate division diffraction element 275 is not limited to one element and may be configured using two optical elements of a wavelength plate and a division diffraction element, for example. In addition, the region 275C may be used as the light receiving unit. In addition, in this embodiment, the region 275C of the wavelength plate division diffraction element 275 is described as the diffraction element. However, a refraction structure may be used.

Eighth Embodiment

Figure 23:
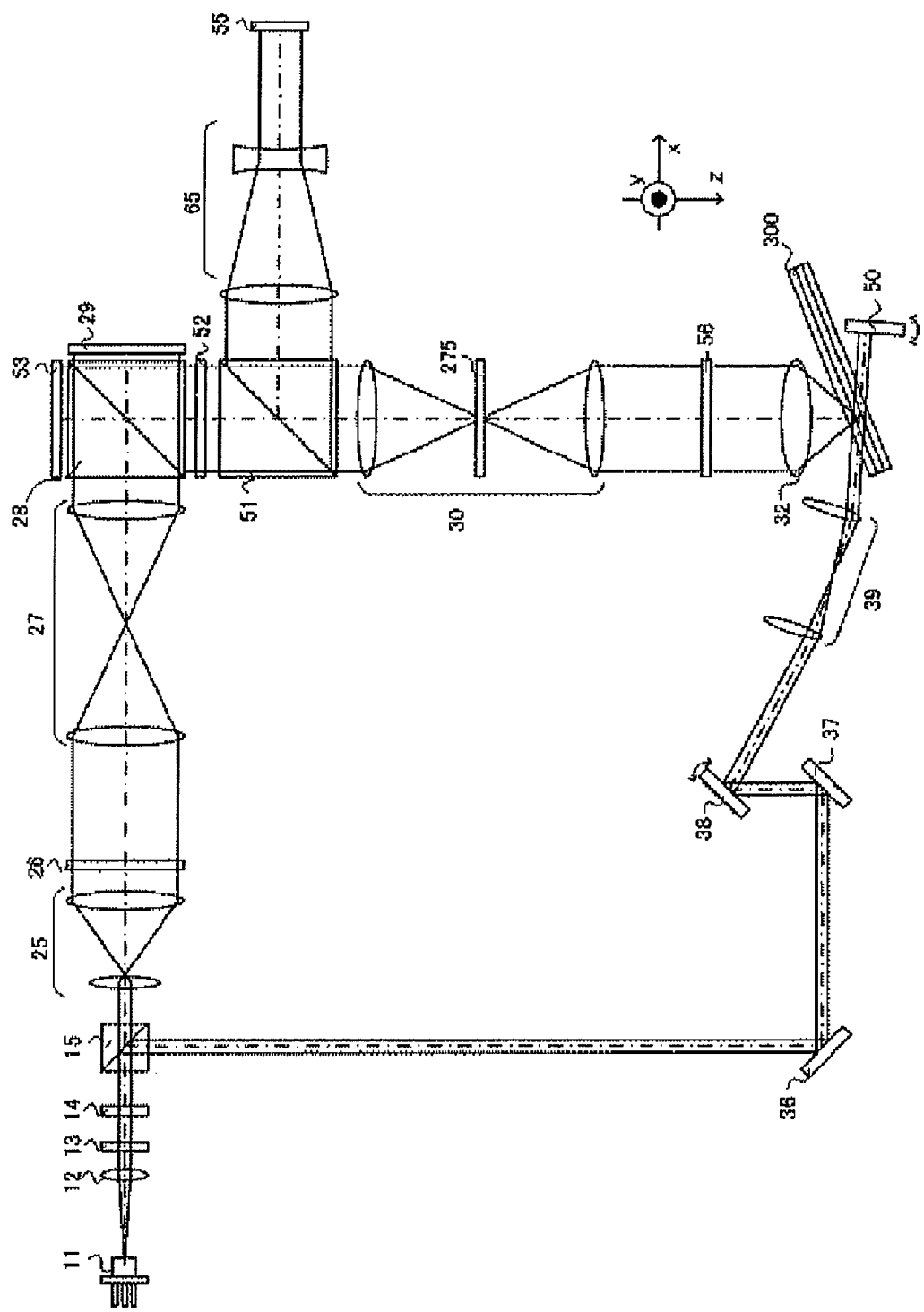
FIG. 23 is a diagram illustrating an optical system in an eighth embodiment.

FIG. 23 illustrates an optical system of an optical pickup device 60 in a hologram reproducing apparatus of a two-beam angle multiplex system according to an eighth embodiment of the present invention. In the seventh embodiment, the configuration in which the opening 100 and the wavelength plate division diffraction element 275 are switched is adopted. However, in this embodiment, a configuration using the wavelength plate division diffraction element 275 and a polarizer 56 is adopted. The other configuration is the same as the configurations of the fourth and seventh embodiments. A recording method of this embodiment is the same as the recording method of the fourth embodiment and a reproducing method is the same as the reproducing method of the seventh embodiment.

In this way, in this embodiment, the wavelength plate division diffraction element 275 is controlled on the basis of a position error signal and reproduced light and other diffracted light are separated. In addition, in the case of this embodiment, the wavelength plate division diffraction element 275 is used to remove a high frequency component of signal light added by a spatial light modulator 29 at the time of recording. For this reason, miniaturization is enabled with respect to the seventh embodiment.

The configuration of this embodiment is the same as the configuration of the seventh embodiment, except for the wavelength plate division diffraction element 275 and the polarizer 56. Therefore, similar to the seventh embodiment, even though the configuration is changed, the same effect is obtained.

As such, the present invention is characterized in that reproduced light from a reproduced hologram and diffracted light from the other holograms are separated using a polarization element or the polarization element and a polarization branching element. In addition, the present invention is characterized in that light is separated into a light beam for reproduction and a light beam for the position error signal, using the polarization element and the polarization branching element. In addition, the present invention is characterized in that the position error signal is detected using the polarization element and the polarization branching element. In addition, the present invention is characterized in that the polarization element is driven using the detected position error signal.

In the first to eighth embodiments, the polarization element is configured using the division wavelength plate 200, the polarizing division diffraction grating 250, and the wavelength plate division diffraction element 275, so that the position error signal is detected while an influence on the reproduction of the diffracted light from the adjacent book at the time of the reproduction is avoided.

The present invention is not limited to the embodiments described above and various modifications are included. For example, the embodiments are described in detail to facilitate the description of the present invention and are not limited to embodiments in which all of the described configurations are included. In addition, a part of the configurations of the certain embodiment can be replaced by the configurations of another embodiment or the configurations of another embodiment can be added to the configurations of the certain embodiment. In addition, for a part of the configurations of the individual embodiments, other configurations can be added, removed, or replaced.

REFERENCE SIGNS LIST

11: semiconductor laser, 12: collimation lens, 13: shutter, 14: polarization variable element, 15: PBS prism, 25: beam expander, 26: phase mask, 27: relay lens, 28: PBS prism, 29: spatial light modulator, 30: relay lens, 32: objective lens, 36: mirror, 37: mirror, 38: galvano mirror, 39: scanner lens, 50: galvano mirror, 51: PBS prism, 52: polarization variable element, 53: imaging element, 54: detection lens, 55: light detector, 65: beam expander, 60: optical pickup device, 70: optical information recording medium driving element, 82: light source driving circuit, 83: servo signal generating circuit, 84: servo control circuit, 85: signal processing circuit, 86: signal generating circuit, 87: shutter control circuit, 88: position control circuit, 89: controller, 99: wavelength plate, 100: opening, 200: division wavelength plate, 250: polarizing division diffraction grating, 275: wavelength plate division diffraction element, 300: optical information recording medium, 512: phase conjugation optical system, 513: optical information recording medium Cure optical system

The invention claimed is:

1. A hologram reproducing apparatus which reproduces an information signal by radiating a reference light to a hologram in an optical information recording medium and generating a reproduced light that includes the information signal when the reference light is radiated to the hologram in the optical information recording medium, comprising:
   a division wavelength plate having at least two transmission regions including a first transmission region that surrounds a second transmission region, wherein the reproduced light passing through the first transmission region is polarized by the first transmission region in a direction substantially orthogonal a direction of the reproduced light passing through the second transmission region;
   a prism which reflects the polarization-converted reproduced light that passes through the first transmission region to separate the polarization-converted reproduced light from the reproduced light that passes through the second transmission region;
   a light detector that is disposed to receive the polarization-converted reproduced light which passes through the first transmission region and that is reflected by the prism;
   an imaging element that is disposed to receive the reproduced light which passes through the second transmission region and through the prism to generate the reproduced information signal;
   a servo control circuit that drives movement of the division wavelength plate; and
   a servo signal generating circuit that generates a signal based on the polarization-converted reproduced light received by the light detector that is output to the servo control circuit to drive a position of the division wavelength plate so that the entire reproduced light is incident on the second transmission region.

2. The hologram reproducing apparatus according to claim 1,
   wherein the division wavelength plate includes a region of a polarization diffraction grating in the first transmission region.

3. The hologram reproducing apparatus according to claim 1,
   wherein the division wavelength plate includes a light shielding region.

4. A reproducing method of a hologram reproducing apparatus which reproduces an information signal by radiating reference light to a hologram in an optical information recording medium to generate a reproduced light that includes the information signal, comprising:
   a step of converting a polarization of the reproduced light from the optical information recording medium with a division wavelength plate having at least two transmission regions including a first transmission region that surrounds a second transmission region, wherein the reproduced light passing through the first transmission region is polarized by the first transmission region in a direction substantially orthogonal a direction of the reproduced light passing through the second transmission region;
   a step of reflecting the polarization-converted reproduced light that passes through the first transmission region with a prism to separate the polarization-converted reproduced light from the reproduced light that passes through the second transmission region;
   a step of detecting the polarization-converted reproduced light which passes through the first transmission region that is reflected by the prism;
   a step of receiving the reproduced light which passes through the second transmission region and through the prism with an imaging element to generate the reproduced information signal;
   a step of driving movement of the division wavelength plate with a servo circuit; and
   a step of generating a signal based on the polarization-converted reproduced light received by the light detector that is output to the servo control circuit to a position of the division wavelength plate so that the entire reproduced light is incident on the second transmission region.

5. The reproducing method of the hologram reproducing apparatus according to claim 4,
   wherein the step of generating the signal to move the division wavelength plate, includes a step of separating signals obtained from the light detector into an X component, a Y component, and a Z component, a step of executing an operation such that the X component, the Y component, and the Z component become predetermined amounts, and a step of detecting values, which are necessary for causing the X component, the Y component, and the Z component to become the predetermined amounts, as position error signals.

6. The hologram reproducing apparatus according to claim 1,
   wherein the light detector includes two or more light detecting areas disposed on predetermined axes of the light detector.

7. The reproducing method of the hologram reproducing apparatus according to claim 4,
   wherein the step of detecting the polarization-converted reproduced light includes detecting the polarization-converted reproduced light with two or more light receiving areas disposed on predetermined axes of the light detector.

* * * * *